(12) United States Patent
Basu Mallick et al.

(10) Patent No.: US 12,101,173 B2
(45) Date of Patent: Sep. 24, 2024

(54) MINIMUM COMMUNICATION RANGE FOR MAC TB

(71) Applicant: Lenovo (Singapore) PTE. LTD., New Tech Park (SG)

(72) Inventors: Prateek Basu Mallick, Dreieich (DE); Joachim Loehr, Wiesbaden (DE); Karthikeyan Ganesan, Nauheim (DE); Ravi Kuchibhotla, Chicago, IL (US)

(73) Assignee: Lenovo (Singapore) Pte. Ltd., New Tech Park (SG)

( * ) Notice: Subject to any disclaimer, the term of this patent is extended or adjusted under 35 U.S.C. 154(b) by 0 days.

(21) Appl. No.: 17/280,148

(22) PCT Filed: Jul. 24, 2020

(86) PCT No.: PCT/IB2020/056980
§ 371 (c)(1),
(2) Date: Mar. 25, 2021

(87) PCT Pub. No.: WO2021/014411
PCT Pub. Date: Jan. 28, 2021

(65) Prior Publication Data
US 2022/0007231 A1 Jan. 6, 2022

Related U.S. Application Data

(60) Provisional application No. 62/877,802, filed on Jul. 23, 2019.

(51) Int. Cl.
*H04W 28/02* (2009.01)
*H04L 47/24* (2022.01)
(Continued)

(52) U.S. Cl.
CPC ......... *H04L 47/24* (2013.01); *H04W 28/0284* (2013.01); *H04W 72/12* (2013.01); *H04W 92/18* (2013.01)

(58) Field of Classification Search
CPC .............. H04W 28/0289; H04L 47/24; H04L 28/0284; H04L 92/18; H04L 72/02; H04L 4/44; H04L 4/46
See application file for complete search history.

(56) References Cited

U.S. PATENT DOCUMENTS

2019/0215897 A1   6/2019  Babaei et al.
2020/0344771 A1*  10/2020 Kang ................ H04W 28/0263
(Continued)

FOREIGN PATENT DOCUMENTS

EP   2782409 A1   9/2014
EP   2887741 A1   6/2015

OTHER PUBLICATIONS

3GPP, 3rd Generation Partnership Project; Technical Specification Group Radio Access Network; CSI Reporting in C-DRX, 3GPP R2-1807688, May 2018, pp. 1-6.
(Continued)

*Primary Examiner* — Syed Ali
*Assistant Examiner* — Najeeb Ansari
(74) *Attorney, Agent, or Firm* — Kunzler Bean & Adamson

(57) ABSTRACT

Apparatuses, methods, and systems are disclosed for MAC TB formation and MCR selection. One apparatus includes a processor that identifies sidelink ("SL") logical channel ("LCH") data having different minimum communication range ("MCR") and multiplexes the SL LCH data having different MCR into a same medium access control ("MAC") transmission block ("TB"). The apparatus includes a transceiver that transmits the MAC TB according to a longest MCR among the SL LCHs included in the MAC TB.

16 Claims, 10 Drawing Sheets

(51) Int. Cl.
*H04W 72/12* (2023.01)
*H04W 92/18* (2009.01)

(56) References Cited

U.S. PATENT DOCUMENTS

| | | | |
|---|---|---|---|
| 2022/0053464 A1* | 2/2022 | Yu | H04W 72/04 |
| 2022/0132491 A1* | 4/2022 | Zhang | H04W 28/0226 |
| 2022/0150730 A1* | 5/2022 | Freda | H04L 1/188 |
| 2022/0182979 A1* | 6/2022 | Freda | H04W 72/12 |
| 2022/0183028 A1* | 6/2022 | Lee | H04W 28/0875 |

OTHER PUBLICATIONS

International Searching Authority, "Notification of Transmittal of the International Search Report and the Written Opinion of the International Searching Authority, or the Declaration", PCT/IB2020/000569, dated Oct. 7, 2020, pp. 1-14.

3GPP, 3rd Generation Partnership Project; Technical Specification Group Radio Access Network; Evolved Universal Terrestrial Radio Access (E-UTRA), Medium Access Control (MAC) protocol specification, 3GPP TS 36.321, V15.6.0, Jun. 2019, pp. 1-133.

3GPP, 3rd Generation Partnership Project; Technical Specification Group Radio Access Network; NR; Medium Access Control (MAC) protocol specification, 3GPP TS 38.321, V15.6.0, Jun. 2019, pp. 1-78.

3GPP, 3rd Generation Partnership Project; Technical Specification Group Radio Access Network; Evolved Universal Terrestrial Radio Access (E-UTRA); Radio Resource Control (RRC); Protocol specification, 3GPP TS 36.331, V15.5.0, Mar. 2019, pp. 1-948.

PCT/IB2020/056980, "Notification of Transmittal of the International Search Report and the Written Opinion of the International Searching Authority, or the Declaration", International Searching Authority, dated Dec. 12, 2020, pp. 1-16.

NTT Docomo, "Remaining Issues on Resource Allocation for UE-to-Network Relay", 3GPP TSG RAN WG1 Meeting #82 R1-154646, Aug. 24-28, 2015, pp. 1-5.

VIVO, "Report of [105bis#33] [NR/V2X] LCP", 3GPP TSG-RAN WG2 Meeting #106 R2-1905846, May 13-17, 2019, pp. 1-29.

Lenovo et al., "SL LCP procedure considering the MCR requirements", 3GPP TSG-RAN WG2 Meeting #108 R2-1915108, Nov. 18-22, 2019, pp. 1-2.

Interdigital Inc., "Remaining Aspects of Sidelink HARQ Feedback for Groupcast", 3GPP RAN WG2 Meeting #109e R2-2000548, Feb. 24-Mar. 6, 2020, pp. 1-4.

* cited by examiner

MINIMUM COMMUNICATION RANGE FOR MAC TB

CROSS-REFERENCE TO RELATED APPLICATIONS

This application claims priority to U.S. Provisional Patent Application No. 62/877,802 entitled "MAC TB FORMATION AND MCR SELECTION FOR V2X COMMUNICATION" and filed on Jul. 23, 2019 for Prateek Basu Mallick, Joachim Loehr, Karthikeyan Ganesan, and Ravi Kuchibhotla, which is incorporated herein by reference. This application claims priority to International Patent Application Number PCT/CN2019/085478 entitled "SIDELINK DATA PACKET ACKNOWLEDGMENT" and filed on May 5, 2019 for Prateek Basu Mallick, Karthikeyan Ganesan, Ravi Kuchibhotla, Alexander Golitschek, Xiaodong Yu, Hyejung Jung, Joachim Loehr, and Vijay Nangia which is incorporated herein by reference. This application claims priority to International Patent Application Number PCT/CN2019/074845 entitled "FEEDBACK REQUEST DETERMINATION" and filed on Feb. 12, 2019 for Prateek Basu Mallick, Xiaodong Yu, Karthikeyan Ganesan, Joachim Loehr, and Haipeng Lei, which is incorporated herein by reference. This application claims priority to U.S. patent application Ser. No. 16/866,090 entitled "UNICAST SESSION OVER A DIRECT COMMUNICATION LINK" and filed on May 4, 2020 for Dimitrios Karampatsis, Prateek Basu Mallick, and Joachim Loehr, which application claims priority to U.S. Provisional Patent Application No. 62/842,406 entitled "UNICAST SESSION OVER A DIRECT COMMUNICATION LINK" and filed on May 2, 2019 for Dimitrios Karampatsis, Prateek Basu Mallick, and Joachim Loehr, which applications are incorporated herein by reference.

FIELD

The subject matter disclosed herein relates generally to wireless communications and more particularly relates to MAC TB formation and minimum communication range ("MCR") selection for V2X communication

BACKGROUND

The following abbreviations are herewith defined, at least some of which are referred to within the following description: Third Generation Partnership Project ("3GPP"), Fifth Generation Core Network ("5CG"), Fifth Generation Quality of Service Identifier ("5QI"), Fifth Generation System ("5GS"), Fifth Generation Absolute Radio Frequency Channel Number ("ARFCN"), Authentication, Authorization and Accounting ("AAA"), Access and Mobility Management Function ("AMF"), Access to Restricted Local Operator Services ("ARLOS"), Positive-Acknowledgment ("ACK"), Application Programming Interface ("API"), Authentication Center ("AuC"), Access Stratum ("AS"), Autonomous Uplink ("AUL"), AUL Downlink Feedback Information ("AUL-DFP"), Base Station ("BS"), Binary Phase Shift Keying ("BPSK"), Bandwidth Part ("BWP"), Buffer Status Report ("BSR"), Cipher Key ("CK"), Clear Channel Assessment ("CCA"), Control Element ("CE"), Cyclic Prefix ("CP"), Cyclical Redundancy Check ("CRC"), Channel State Information ("CSI"), Common Search Space ("CSS"), Connection Mode ("CM", this is a NAS state in 5GS), Core Network ("CN"), Control Plane ("CP"), Data Radio Bearer ("DRB"), Dedicated Short Range Communication ("DSRC"), Discrete Fourier Transform Spread ("DFTS"), Downlink ("DL"), DL Control Information ("DCI"), DL Pilot Time Slot ("DwPTS"), Dual Connectivity ("DC"), Dual Registration mode ("DR mode"), Discontinuous Transmission ("DTX"), Enhanced Clear Channel Assessment ("eCCA"), Enhanced Licensed Assisted Access ("eLAA"), Enhanced Mobile Broadband ("eMBB"), Evolved Node-B ("eNB"), Evolved Packet Core ("EPC"), Evolved Packet System ("EPS"), EPS Mobility Management ("EMM", this is a NAS state in EPS), Evolved UMTS Terrestrial Radio Access ("E-UTRA"), E-UTRA Absolute Radio Frequency Channel Number ("EARFCN"), Evolved UMTS Terrestrial Radio Access Network ("E-UTRAN"), European Telecommunications Standards Institute ("ETSI"), Frame Based Equipment ("FBE"), Frequency Division Duplex ("FDD"), Frequency Division Multiple Access ("FDMA"), Frequency Division Orthogonal Cover Code ("FD-OCC"), General Packet Radio Service ("GPRS"), Generic Public Service Identifier ("GPSI"), Guard Period ("GP"), Global System for Mobile Communications ("GSM"), Globally Unique Temporary UE Identifier ("GUTI"), Hybrid Automatic Repeat Request ("HARQ"), Home Subscriber Server ("HSS"), Home Public Land Mobile Network ("HPLMN"), Information Element ("IE"), Integrity Key ("IK"), Internet-of-Things ("IoT"), International Mobile Subscriber Identity ("IMSI"), Key Derivation Function ("KDF"), Licensed Assisted Access ("LAA"), Load Based Equipment ("LBE"), Logical Channel ("LCH"), Logical Channel Prioritization ("LCP"), Listen-Before-Talk ("LBT"), Long Term Evolution ("LTE"), Multiple Access ("MA"), Medium Access Control ("MAC"), MAC Control Element ("MAC CE"), MAC Service Data Unit ("MAC SDU"), MAC Protocol Data Unit ("MAC PDU"), Minimum Communication Range ("MCR"), Mobility Management ("MM"), Mobility Management Entity ("MME"), Modulation Coding Scheme ("MCS"), Machine Type Communication ("MTC"), Multiple Input Multiple Output ("MIMO"), Mobile Station International Subscriber Directory Number ("MSISDN"), Multi User Shared Access ("MUSA"), Narrowband ("NB"), Negative-Acknowledgment ("NACK") or ("NAK"), New Generation (5G) Node-B ("gNB"), New Generation Radio Access Network ("NG-RAN", a RAN used for 5GS networks), New Radio ("NR", a 5G radio access technology; also referred to as "5G NR"), Next Hop (NH"), Next Hop Chaining Counter ("NCC"), Non-Access Stratum ("NAS"), Network Exposure Function ("NEF"), Non-Orthogonal Multiple Access ("NOMA"), Network Slice Selection Assistance Information ("NSSAI"), Operation and Maintenance System ("OAM"), Orthogonal Frequency Division Multiplexing ("OFDM"), 5QI for the PC5 interface ("PQI"), Packet Data Unit ("PDU", used in connection with 'PDU Session'), Packet Switched ("PS", e.g., Packet Switched domain or Packet Switched service), Pattern Division Multiple Access ("PDMA"), Primary Cell ("PCell"), Physical Broadcast Channel ("PBCH"), Physical Cell Identity ("PCI"), Physical Downlink Control Channel ("PDCCH"), Physical Downlink Shared Channel ("PDSCH"), Physical Hybrid ARQ Indicator Channel ("PHICH"), Physical Random Access Channel ("PRACH"), Physical Resource Block ("PRB"), Physical Sidelink Control Channel ("PSCCH"), Physical Sidelink Shared Channel ("PSSCH"), Physical Uplink Control Channel ("PUCCH"), Physical Uplink Shared Channel ("PUSCH"), Public Land Mobile Network ("PLMN"), Quality of Service ("QoS"), Quadrature Phase Shift Keying ("QPSK"), Radio Access Network ("RAN"), Radio Access Technology ("RAT"), Radio Resource Control ("RRC"), Random-Access Channel ("RACH"), Random Access Response ("RAR"), Radio Network Temporary Identifier ("RNTI"), Reference Signal ("RS"), Registration Area ("RA", similar to tacking area list used in LTE/EPC), Registration Management ("RM", refers to NAS layer procedures and states), Remaining Minimum System Information ("RMSI"), Resource Spread Multiple Access ("RSMA"), Round Trip Time ("RTT"), Receive ("RX"), Radio Link Control ("RLC"), Secondary Cell ("SCell"), Shared Channel ("SCH"), Single Carrier Frequency Division Multiple Access ("SC-FDMA"), Sparse Code Multiple Access ("SCMA"), System Information Block ("SIB"), Subscriber Identification Module ("SIM"), Signal-to-Interference-Plus-Noise Ratio ("SINR"), Sidelink ("SL"), SL Control Information ("SCI"), SL Logical Channel ("SL LCH"), Session Management ("SM"), Session Management Function ("SMF"), Single Network Slice Selection Assistance Information ("S-NSSAI"), Service Provider ("SP"), Scheduling Request ("SR"), Single Registration mode ("SR mode"), Sounding Reference Signal ("SRS"), Synchronization Signal ("SS"), Supplementary Uplink ("SUL"), Tracking Area ("TA"), Transport Block ("TB"), Transport Block Size ("TBS"), Time-Division Duplex ("TDD"), Time Division Multiplex ("TDM"), Time Division Orthogonal Cover Code ("TD-OCC"), Transmission Time Interval ("TTI"), Transmit ("TX"), Unified Access Control ("UAC"), Unified Data Management ("UDM"), User Data Repository ("UDR", may be co-located with UDM), User Entity/Equipment (Mobile Terminal) ("UE"), UE Configuration Update ("UCU"), UE Route Selection Policy ("URSP"), Uplink ("UL"), UL Control Information ("UCI"), UL Pilot Time Slot ("UpPTS"), Universal Mobile Telecommunications System ("UMTS"), UMTS/Universal Subscriber Identification Module ("USIM"), UMTS Terrestrial Radio Access ("UTRA"), UMTS Terrestrial Radio Access Network ("UTRAN"), User Plane ("UP"), Ultra-reliability and Low-latency Communications ("URLLC"), Vehicle-to-Everything ("V2X"), Visited Public Land Mobile Network ("VPLMN"), and Worldwide Interoperability for Microwave Access ("WiMAX"). As used herein, "HARQ-ACK" may represent collectively the Positive Acknowledge ("ACK") and the Negative Acknowledge ("NACK") and Discontinuous Transmission ("DTX"). ACK means that a TB is correctly received while NACK (or NAK) means a TB is erroneously received. DTX means that no TB was detected.

In certain wireless communication systems, V2X communication allows vehicles to communicate with moving parts of the traffic system around them. Two resource allocation modes are used in LTE V2X communication which are also considered as a baseline for corresponding resource allocation modes in NR V2X communication. Mode-1 corresponds to a NR network-scheduled V2X communication mode. Mode-2 corresponds to an LTE network-scheduled V2X communication mode. Mode-3 corresponds to a NR UE-scheduled V2X communication mode. Mode-4 corresponds to an LTE UE-scheduled V2X communication mode.

V2X takes in account four different interaction scenarios, i.e. Vehicle-to-Vehicle ("V2V"), Vehicle-to-Pedestrian ("V2P"), Vehicle-to-Infrastructure ("V2I"), and Vehicle-to-Network ("V2N") communications. For V2V, two main technologies are currently developed for the short-range radio communication, one is the IEEE Dedicated Short Range Communications ("DSRC", based on the IEEE 802.11p standard) and the other the 3GPP PC5 (also known as LTE-V or sidelink ("SL") at the physical layer) standard. PC5 refers to a reference point where one UE directly communicates with another UE over the direct channel. For V2I and V2N, cellular links (i.e., Cellular V2X or "C-V2X") may be used to enable vehicle communication with the roadside equipment (roadside units, traffic lights, etc.).

MCR or Minimum Communication Range is the distance (Range) in meters from the transmitter V2X UE (or a device) where the QoS fulfilment actually applies. MCR is assigned by the V2X layers/application and will be signaled alongside the QoS (indicated using PQI—i.e., 5G QoS indicator for the PC5 interface) to the Access Stratum (AS). The QoS (indicated using PQI) applicable to a V2X message must be fulfilled in this Range. MCR is therefore important in seeking HARQ feedback from the receiver UEs ("Rx UEs").

BRIEF SUMMARY

Methods for MAC TB formation and MCR selection are disclosed. Apparatuses and systems also perform the functions of the methods.

A first method of a remote unit, i.e., a UE, for MAC TB formation and MCR selection includes identifying SL LCH data having different MCR and multiplexing the SL LCH data having different MCR into a same MAC TB. The first method includes transmitting the MAC TB according to a longest MCR among the SL LCHs included in the MAC TB.

A second method of a remote unit for MAC TB formation and MCR selection includes detecting a time-domain collision between a SL transmission and an UL transmission, wherein the remote unit does not support simultaneous transmission on both SL and UL. The second method includes identifying a QoS priority of the SL transmission and identifying a QoS priority of the UL transmission. The second method includes prioritizing the SL transmission over the UL transmission in response to the QoS priority of the SL transmission being less than a SL priority threshold and the QoS priority of the UL transmission not being less than a UL priority threshold.

A third method of a remote unit for MAC TB formation and MCR selection includes identifying LCH data for V2X having different destinations and multiplexing the LCH data for V2X having different destinations into a same MAC TB. The third method includes transmitting the MAC TB according to a common MCR.

A fourth method of a remote unit for MAC TB formation and MCR selection includes multiplexing SL LCH data having different MCR into a same MAC TB and identifying a highest priority SL LCH the having SL LCH data included in the MAC TB. The fourth method includes transmitting the MAC TB according to the MCR of the highest priority SL LCH.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
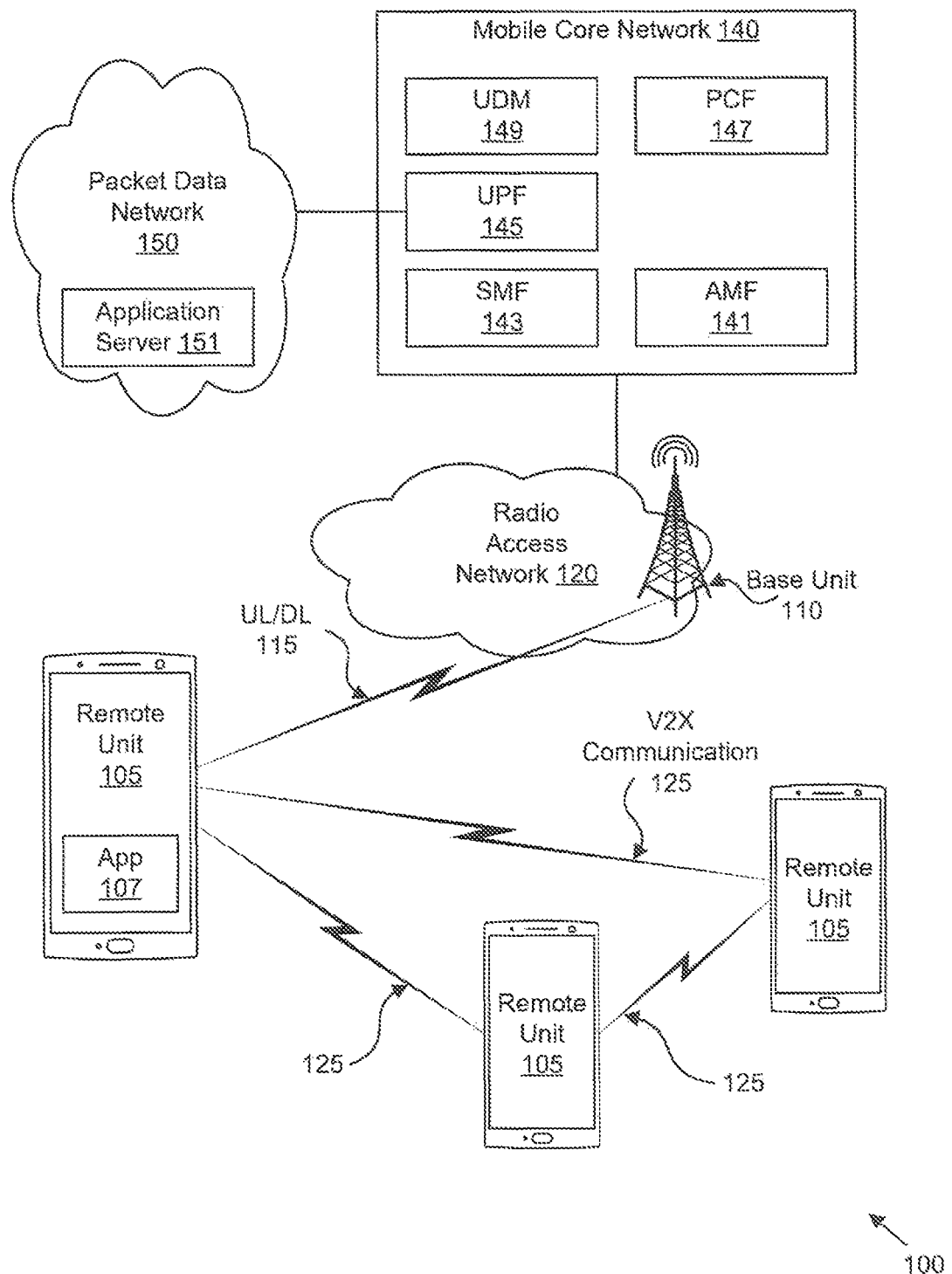
FIG. 1 is a schematic block diagram illustrating one embodiment of a wireless communication system for MAC TB formation and MCR selection.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain or store a program for use by or in connection with an instruction execution system, apparatus, or device.

Code for carrying out operations for embodiments may be any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C"

includes only A, only B or only C and excludes combinations of A, B and C. As used herein, "a member selected from the group consisting of A, B, and C," includes one and only one of A, B, or C, and excludes combinations of A, B, and C." As used herein, "a member selected from the group consisting of A, B, and C and combinations thereof" includes only A, only B, only C, a combination of A and B, a combination of B and C, a combination of A and C or a combination of A, B and C.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart diagrams and/or block diagrams.

The code may also be stored in a storage device that can direct a computer, other programmable data processing apparatus, or other devices to function in a particular manner, such that the instructions stored in the storage device produce an article of manufacture including instructions which implement the function/act specified in the flowchart diagrams and/or block diagrams.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart diagrams and/or block diagrams.

The flowchart diagrams and/or block diagrams in the Figures illustrate the architecture, functionality, and operation of possible implementations of apparatuses, systems, methods, and program products according to various embodiments. In this regard, each block in the flowchart diagrams and/or block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Generally, the present disclosure describes systems, methods, and apparatus for MAC TB formation and MCR selection for V2X communication, e.g., of UEs engaged in V2X communication. MCR or Minimum Communication Range is the distance (Range) in meters from the transmitter V2X UE (or a device) where the QoS fulfilment actually applies. MCR is assigned by the V2X layers/application and will be signaled alongside the QoS (indicated using PQI) to the Access Stratum (AS). The QoS (indicated using PQI) applicable to a V2X message must be fulfilled in this Range. MCR is therefore important in seeking HARQ feedback from the Rx UEs.

In some embodiments, the transmitter and receiver UEs solicit and provide PC5 HARQ feedback for the PSSCH transmissions made by the transmitter UE (i.e., source UE) to one or more receiver UE(s). For SL unicast and groupcast, HARQ feedback and HARQ combining in the physical layer may be supported. In various embodiments, HARQ-ACK feedback for a PSSCH is carried in SFCI format(s) via PSFCH in resource allocation Mode-1 and Mode-2.

When SL HARQ feedback is enabled for unicast, in the case of non-CBG operation the receiver UE generates HARQ-ACK if it successfully decodes the corresponding TB. It generates HARQ-NACK if it does not successfully decode the corresponding TB after decoding the associated PSCCH targeted to the receiver UE.

When SL HARQ feedback is enabled for groupcast, it is supported to use TX-RX distance and/or RSRP in deciding whether to send HARQ feedback. In the case of non-CBG operation, two options are supported:

According to SL HARQ feedback Option 1, the Receiver UE (i.e., target UE) transmits HARQ-NACK on PSFCH if it fails to decode the corresponding TB after decoding the associated PSCCH and transmits no signal on PSFCH otherwise (i.e., the Rx UE does not transmit HARQ-ACK on PSFCH if it successfully decodes the corresponding TB).

According to SL HARQ feedback Option 2, the Receiver UE ("Rx UE") transmits HARQ-ACK on PSFCH if it successfully decodes the corresponding TB. Additionally, the Rx UE transmits HARQ-NACK on PSFCH if it does not successfully decode the corresponding TB after decoding the associated PSCCH which targets the receiver UE.

A NACK feedback from a UE within MCR limits may very likely trigger re-transmissions from a transmitter UE ("Tx UE"); or trigger re-transmissions from a Rx UE that successfully received and decoded the said transmission. Generally, in LTE based vehicular communication, as described in 3GPP TS 36.331 (v15.5.0), the Tx UE prepares a TB for a specific (ProSe) destination. If data from all the LCH(s) belonging to the same destination may not be accommodated in the same TB due to MCR constraint (different LCH have different MCR), assuming the grant size is sufficient though, the Tx UE may need to form separate TBs towards the same destination.

Given the number of V2X applications, their varying requirements, automation levels etc., there could be anyway many destinations to be addressed by a Tx UE. This together with MCR constraint may further multiply the number of required TB formation at the Tx UE and increase system inefficiency due to un-necessary padding. This is not just a Tx UE's processing and System's physical resource wastage issue but also affects the QoS fulfilment, especially the latency aspect, if the Tx UE may not be able to acquire or select resources (Mode-1 or Mode-2 grants, respectively) for transmission of as many TBs within their latency requirements. Therefore, resource (in)-efficiency is just one aspect, the other being PDB (packet delay budget). If the Tx UE can only transmit one LCH to one destination at a sidelink (SL) opportunity, it will take longer to cater to all LCHs/destinations—this might hinder the latency requirements as discussed below with reference to FIG. 2.

On the other hand, while forming a MAC TB for a particular destination (e.g. L2 destination), it is not defined how the MCR can be respected for the data from each LCH that is part of the MAC TB if the MCR is different for each or some of the LCHs. Since, following the logical channel prioritization procedure, these LCHs would become part of the same MAC TB, only one MCR can be applied and signaled by the Tx UE in the PSCCH (e.g., SCI).

Sub-optimal selection of MCR may result in poor or non-fulfilment of QoS of one or more of the V2X application(s) and a MAC TB formation towards only one destination may also be inefficient in certain circumstances. The present document outlines procedures for MAC TB formation and MCR selection for V2X communication. In particular, the V2X UEs may multiplex more than one destination in the same PC5 MAC TB. Here, Layer-1 ("L1") identities for filtering can be: a) a dummy value (e.g., no L1 filtering), b) as many L1 identities present, or c) a combined L1 identity allowing "partial" L1 filtering. Various MAC header/subheader and PDU structures for multiplexing more than one destination in the same PC5 MAC TB are described below.

For MCR determination, in one embodiment normal logical channel prioritization ("LCP") may be determined first and then the MCR determined corresponding to highest LCH included in the TB. In another embodiment, normal LCP may first be determined and then the MCR is determined as the MCR of the LCH having the highest MCR among the LCHs included in the TB. In other embodiments, the MCR determination may be first determined based on the highest priority the LCH having data available for transmission.

In certain embodiments, LCP is performed among LCHs having the same MCR. In certain embodiments, LCP is performed among LCHs having the same or lower MCR. In certain embodiments, the MAC CE(s) may have no associated MCR. In some embodiments, the MCR of the combined TB is determined after the TB generation using one or more of an arithmetic mean, median or mode of the MCR values corresponding to the LCH(s) that are part of the said TB.

If there are more than one destination multiplexed in the TB, then: a) MCR determination ignoring the destination; b) MCR determination is only guided by highest priority destination, if a destination priority has been signaled from upper layer; or c) MCR determination is only guided by highest priority cast-type. In some embodiments, a V2X UE puts V2X SDUs received from upper layer in corresponding SL radio bearer/SL LCH. UE only puts packets with same MCR in one SL LCH/SL Radio bearer.

In various embodiments, the V2X UE sends a buffer status report, initiates acquisition of a Mode 2 grant only when there is at least one recipient UE. Here, upper layers may inform the AS layer about the number of Rx UE(s).

In various embodiments, the Tx UE gets to know the total number of Rx UEs based on Upper layer information, e.g., the upper layer(s) provide the total number of SL UEs in a group to the lower layer(s). Here, this knowledge at the Physical layer is accurate to the extent required for physical layer functioning at any given point in time; even if the group members are updated, the Physical layer is informed in a reasonably quick time frame.

FIG. 1 depicts a wireless communication system 100 for MAC TB formation and MCR selection for V2X communication for wireless devices communicating V2X messages 125, according to embodiments of the disclosure. In one embodiment, the wireless communication system 100 includes at least one remote unit 105, a radio access network ("RAN") 120, and a mobile core network 140. The RAN 120 and the mobile core network 140 form a mobile communication network. The RAN 120 may be composed of a base unit 110 with which the remote unit 105 communicates using wireless communication links 115. Even though a specific number of remote units 105, base units 110, wireless communication links 115, RANs 120, and mobile core networks 140 are depicted in FIG. 1, one of skill in the art will recognize that any number of remote units 105, base units 110, wireless communication links 115, RANs 120, and mobile core networks 140 may be included in the wireless communication system 100.

In one implementation, the RAN 120 is compliant with the 5G system specified in the 3GPP specifications. In another implementation, the RAN 120 is compliant with the LTE system specified in the 3GPP specifications. More generally, however, the wireless communication system 100 may implement some other open or proprietary communication network, for example WiMAX, among other networks. The present disclosure is not intended to be limited to the implementation of any particular wireless communication system architecture or protocol.

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle onboard computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as the UEs, subscriber units, mobiles, mobile stations, users, terminals, mobile terminals, fixed terminals, subscriber stations, user terminals, wireless transmit/receive unit ("WTRU"), a device, or by other terminology used in the art.

The remote units 105 may communicate directly with one or more of the base units 110 in the RAN 120 via uplink ("UL") and downlink ("DL") communication signals. Furthermore, the UL and DL communication signals may be carried over the wireless communication links 115. Here, the RAN 120 is an intermediate network that provides the remote units 105 with access to the mobile core network 140.

In some embodiments, the remote units 105 communicate with an application server 151 via a network connection with the mobile core network 140. For example, an application 107 (e.g., web browser, media client, telephone/VoIP application) in a remote unit 105 may trigger the remote unit 105 to establish a PDU session (or other data connection) with the mobile core network 140 via the RAN 120. The mobile core network 140 then relays traffic between the remote unit 105 and the application server 151 in the packet data network 150 using the PDU session. Note that the remote unit 105 may establish one or more PDU sessions (or other data connections) with the mobile core network 140. As such, the remote unit 105 may concurrently have at least one PDU session for communicating with the packet data network 150 and at least one PDU session for communicating with another data network (not shown).

The base units 110 may be distributed over a geographic region. In certain embodiments, a base unit 110 may also be referred to as an access terminal, an access point, a base, a base station, a Node-B, an eNB, a gNB, a Home Node-B, a relay node, a RAN node, or by any other terminology used in the art. The base units 110 are generally part of a radio access network ("RAN"), such as the RAN 120, that may include one or more controllers communicably coupled to one or more corresponding base units 110. These and other elements of radio access network are not illustrated but are well known generally by those having ordinary skill in the art. The base units 110 connect to the mobile core network 140 via the RAN 120.

The base units 110 may serve a number of remote units 105 within a serving area, for example, a cell or a cell sector, via a wireless communication link 115. The base units 110 may communicate directly with one or more of the remote units 105 via communication signals. Generally, the base units 110 transmit DL communication signals to serve the remote units 105 in the time, frequency, and/or spatial domain. Furthermore, the DL communication signals may be carried over the wireless communication links 115. The wireless communication links 115 may be any suitable carrier in licensed or unlicensed radio spectrum. The wireless communication links 115 facilitate communication between one or more of the remote units 105 and/or one or more of the base units 110.

In one embodiment, the mobile core network 140 is a 5G core ("5GC") or the evolved packet core ("EPC"), which may be coupled to a packet data network 150, like the Internet and private data networks, among other data networks. A remote unit 105 may have a subscription or other account with the mobile core network 140. Each mobile core network 140 belongs to a single public land mobile network ("PLMN"). The present disclosure is not intended to be limited to the implementation of any particular wireless communication system architecture or protocol.

The mobile core network 140 includes several network functions ("NFs"). As depicted, the mobile core network 140 includes multiple user plane functions ("UPFs") 145. The mobile core network 140 also includes multiple control plane functions including, but not limited to, an Access and Mobility Management Function ("AMF") 141 that serves the RAN 120, a Session Management Function ("SMF") 143, and a Policy Control Function ("PCF") 147. In certain embodiments, the mobile core network 140 may also include an Authentication Server Function ("AUSF"), a Unified Data Management function ("UDM") 149, a Network Repository Function ("NRF") (used by the various NFs to discover and communicate with each other over APIs), or other NFs defined for the 5GC.

In various embodiments, the mobile core network 140 supports different types of mobile data connections and different types of network slices, wherein each mobile data connection utilizes a specific network slice. Here, a "network slice" refers to a portion of the mobile core network 140 optimized for a certain traffic type or communication service. In certain embodiments, the various network slices may include separate instances of network functions, such as the SMF 143 and UPF 145. In some embodiments, the different network slices may share some common network functions, such as the AMF 141. The different network slices are not shown in FIG. 1 for ease of illustration, but their support is assumed.

Although specific numbers and types of network functions are depicted in FIG. 1, one of skill in the art will recognize that any number and type of network functions may be included in the mobile core network 140. Moreover, where the mobile core network 140 is an EPC, the depicted network functions may be replaced with appropriate EPC entities, such as an MME, S-GW, P-GW, HSS, and the like. In certain embodiments, the mobile core network 140 may include a AAA server.

In various embodiments, the remote units 105 may communicate directly with each other (e.g., device-to-device communication) using V2X communication signals 125. Here, V2X transmissions may occur on V2X resources. As discussed above, a remote unit 105 may be provided with different V2X communication resources for different V2X modes. Mode-1 corresponds to a NR network-scheduled V2X communication mode. Mode-2 corresponds to an LTE network-scheduled V2X communication mode.

While FIG. 1 depicts components of a 5G RAN and a 5G core network, the described embodiments for MAC TB formation and MCR selection for V2X communication apply to other types of communication networks and RATs, including IEEE 802.11 variants, GSM, GPRS, UMTS, LTE variants, CDMA 2000, Bluetooth, ZigBee, Sigfoxx, and the like. For example, in an LTE variant involving an EPC, the AMF 135 may be mapped to an MME, the SMF mapped to a control plane portion of a PGW and/or to an MME, the UPF map to an SGW and a user plane portion of the PGW, the UDM/UDR maps to an HSS, etc.

Figure 2:
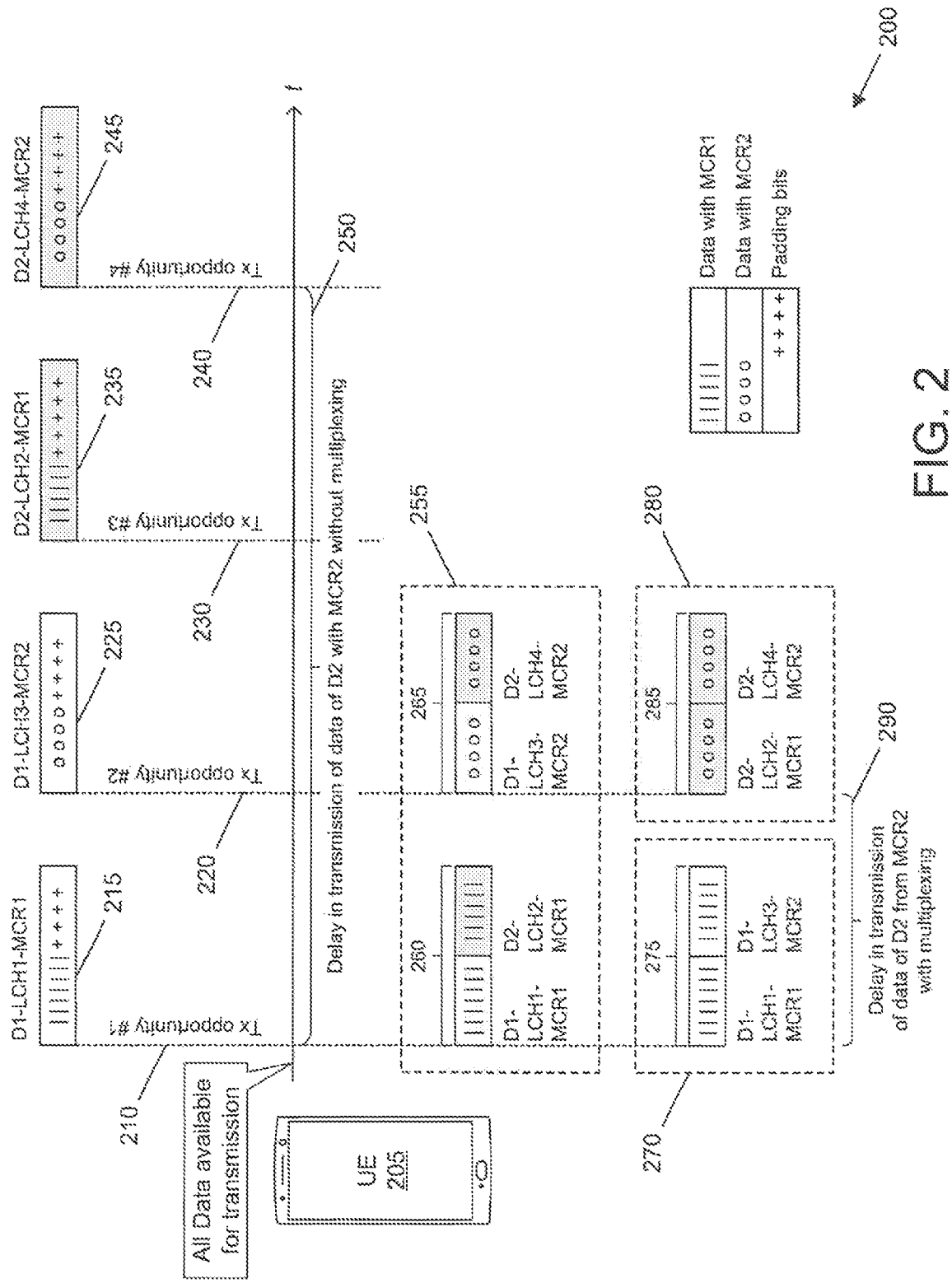
FIG. 2 is a diagram illustrating one embodiment of data transmission from two destination (D1 and D2) with LCHs with different MCR.

In the following descriptions, the term eNB/gNB is used for the base station but it is replaceable by any other radio access node, e.g., BS, eNB, gNB, AP, NR, etc. Further the operations are described mainly in the context of 5G NR. However, the proposed solutions/methods are also equally applicable to other mobile communication systems supporting serving cells/carriers being configured for Sidelink Communication over PC5 interface. FIG. 2 depicts a data delivery diagram 200 illustrating data delivery from two destinations (D1 and D2) with LCHs having different MCR. Here, it is assumed that a V2X application naming on the UE 205 has data for destinations D1 and D2 and having MCR of MCR1 and MCR2, all data being available prior to the first transmission opportunity 210. In the diagram 200, the data for destination D2 is shaded, while the data for destination D1 is unshaded. Moreover, data having MCR of MCR1 is indicated using the symbol T, data having MCR of MCR1 is indicated using the symbol 'o', and data having MCR of MCR1 is indicated using the symbol '+'.

According to one technique, a unique packet is formed for each combination of destination and MCR. As depicted, at the first transmission opportunity 210, the UE 205 may transmit a first TB 215 for destination D1 having MCR1. At the second transmission opportunity 220, the UE may transmit a second TB 225 for destination D1 having MCR2. Further, at the third transmission opportunity 230, the UE 205 may transmit a third TB 235 for destination D2 and MCR1 and, at the fourth transmission opportunity 240, transmit a fourth TB 245 for destination D2 having MCR2. This first technique results in a first delay 250 in transmission of data from MCR2 of destination D2 (i.e., measured as the time between the first transmission opportunity 210 and the fourth transmission opportunity 240). However, the first delay 250 may result in in poor or non-fulfilment of QoS of at least some of the V2X application.

To improve data delivery efficiency, the UE 205 may multiplex data with different destinations and/or different MCRs. Various solutions for improving data delivery efficiency are described below.

According to a first solution, the transmitter UE 205 multiplexes data towards more than one destination in the same MAC TB. This is depicted in delivery scheme 255, where data for destination D1 is multiplexed with data for destination D2 into TB 260 and TB 265, thereby reducing the delivery delay. The delivery scheme 255 allows for better packing of MAC TB improving system efficiency, latency and reducing resource wastage in padding. Note that the embodiments presented herein apply irrespective of cast types, i.e., irrespective of if the transmissions are made for one or more of Unicast, Groupcast and/or Broadcast traffic. While the delivery scheme 255 shows grouping data having the same MCR into the same TB (i.e., TB 260 has MCR1 and TB 265 has MCR2), in other embodiments the UE 205 may multiplex data towards more than one destination and having more than one MCR.

According to one alternative multiplexing scheme 270, the UE 205 may multiplex data having different MCR into a TB 275 and transmit the TB 275 according to the longest MCR of the multiplexed data. In the depicted embodiment, it is assumed that MCR1 is a greater distance than MCR2. Thus, the TB 275 is transmitted with MCR1 even though some data (i.e., of LCH3) has a shorter MCR. While the delivery scheme 270 shows grouping data having the same destination into the same TB (i.e., TB 275 has only data for destination D1), in other embodiments the UE 205 may multiplex data towards more than one destination and having more than one MCR.

In another alternative multiplexing scheme 280, the transmitter UE 205 may multiplex data having different MCR into a TB 285 and transmit the TB 285 according to the MCR of a highest priority LCH having data in the TB 285. In the depicted embodiment, it is assumed that LCH4 is a higher priority than LCH2. Thus, the TB 285 is transmitted with MCR2 even though some data (i.e., of LCH2) has a longer MCR. While the delivery scheme 280 shows grouping data having the same destination into the same TB (i.e., TB 285 has only data for destination D2), in other embodiments the UE 205 may multiplex data towards more than one destination and having more than one MCR.

The determined MCR is signaled in SCI to the Rx UEs. Rx UEs, having determined their distance from the transmitter (i.e., Tx UE 205), check if they are within the MCR (as received in SCI). If so, the Rx UEs provide the HARQ feedback to the Tx UE 205 depending on the feedback option in use currently. If not within the signaled MCR, the Rx UEs do not provide HARQ feedback to the Tx UE 205. According to a first option, the Rx UE transmits only HARQ NACK (Option 1). According to a second option, the Rx UE transmits both HARQ ACK and HARQ NACK feedback (Option 2). Solutions on how to assign MCR to a MAC TB with a single destination are described in further detail below.

Figure 3:
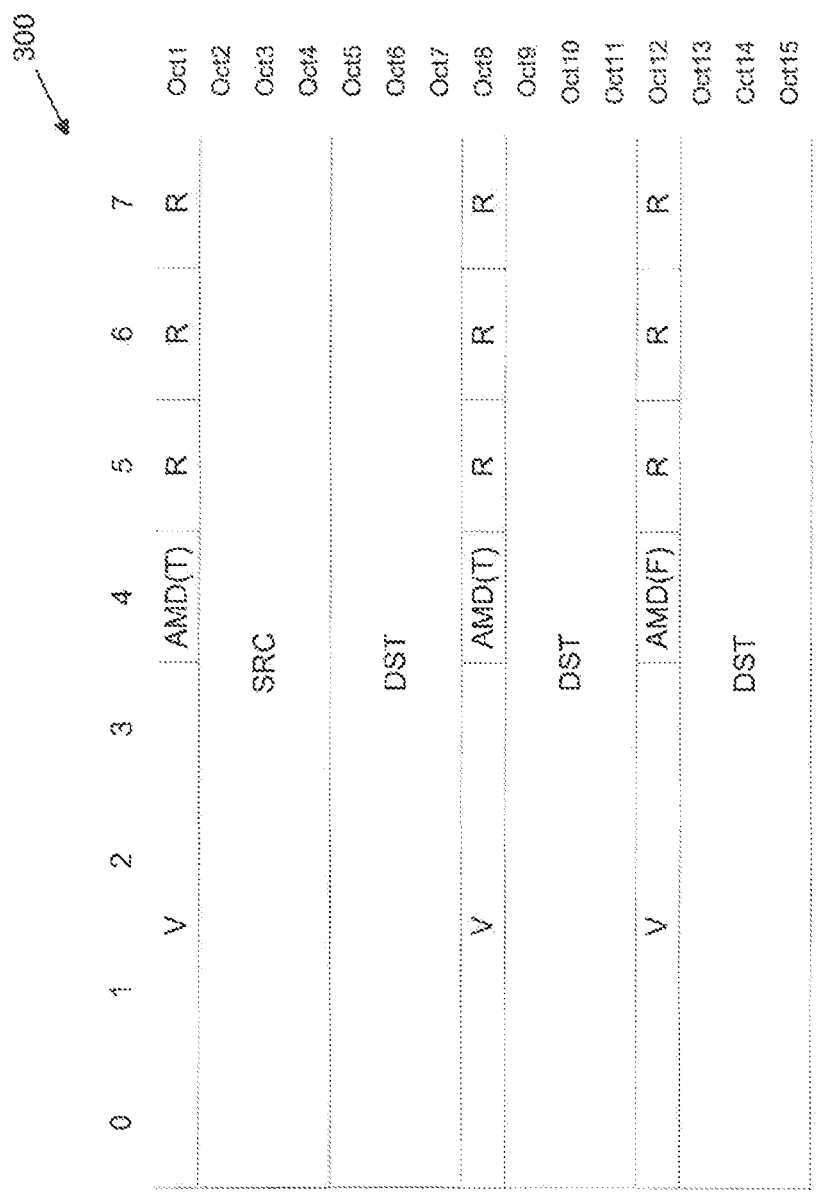
FIG. 3 is a diagram illustrating one embodiment of a V2X MAC subheader.

FIG. 3 depicts a V2X MAC subheader 300, according to embodiments of the disclosure. The MAC subheader 300 may be used to implement the first solution, i.e., multiplexing data towards more than one destination in the same TB. In some embodiments, multiple Layer-2 (L2) Destination IDs are carried in the MAC subheader 300. The content of the MAC subheader 300 may contain the following:

V: Version of the NR V2X Protocol. In the depicted embodiment, the Version is indicated using a 4-bit field (e.g., bits 0-3) of the first octet ('Oct1').

SRC: It is the Source ID, e.g., a 24-bit (3-octet) source address. This may be a single value if the same Source ID applies to all destinations to be addressed in this MAC PDU and multiple source identities otherwise (note that the embodiment of FIG. 3 shows a single Source ID). In the depicted embodiment, the SRC field comprises the second through fourth octets.

DST: It is the Destination ID, e.g., a 24-bit (3-octet) destination address. In the depicted embodiment, the first DST field comprises the fifth through seventh octets.

AMD: Any More Destination-Flag. For example, a 1-bit flag indicating whether there is one more Destination ID contained. If this flag is set (i.e., having the value 'true'), then another Destination ID follows (note that the first Destination ID is always present). In one embodiment, the value 'true' is indicated using the bit-value '1' and the value 'false' is indicated using the bit-value '0'. In another embodiment, the value 'true' is indicated using the bit-value '0' and the value 'false' is indicated using the bit-value '1'.

In the depicted embodiment, the AMD flag is set to 'true' for the first and second instances. Note that because the first AMD flag is set to 'true', a Rx UE knows that a second set of V, AMD, and R fields will follow the first DST field. Similarly, the Rx UE knows that a third set of V, AMD, and R fields will follow the second DST field because the second AMD flag is set to 'true'. However, in the third instance, the AMD flag is set to 'false' as there are only three DST fields in the MAC subheader 300.

R: Reserved bit.

In certain embodiments, the MAC subheader 300 includes a field (Length Field, not depicted in FIG. 3). Note that N−1 "L" fields may be present.

Note that FIG. 3 is only one possible implementation of the V2X MAC subheader 300. In one variant, the second and further 'V' field(s) can be omitted (i.e., replaced with reserved bits and AMD flag comes at the front of the particular Octet.

In another variant, the 'V' field and the 'R' fields in the first Octet remain but the 'V' field and the 'R' fields in other Octets (e.g., eight and twelfth octets) are replaced with a length field for signaling the length of all the data together for the corresponding destination. In this variant, the AMD field is still present. The last field in this variant for each destination may be omitted as well.

In yet another variant, the 'V' field and the 'R' fields in the first Octet remain but the 'V' field and the 'R' fields in other Octets are replaced with a Subheader-COUNT field for signaling the number of all the subheader(s) for the corresponding destination. In this variant, the AMD field is still present. Likewise, there could be numerous other implementations achieving the same purpose; only some examples are mentioned above.

Figure 4:
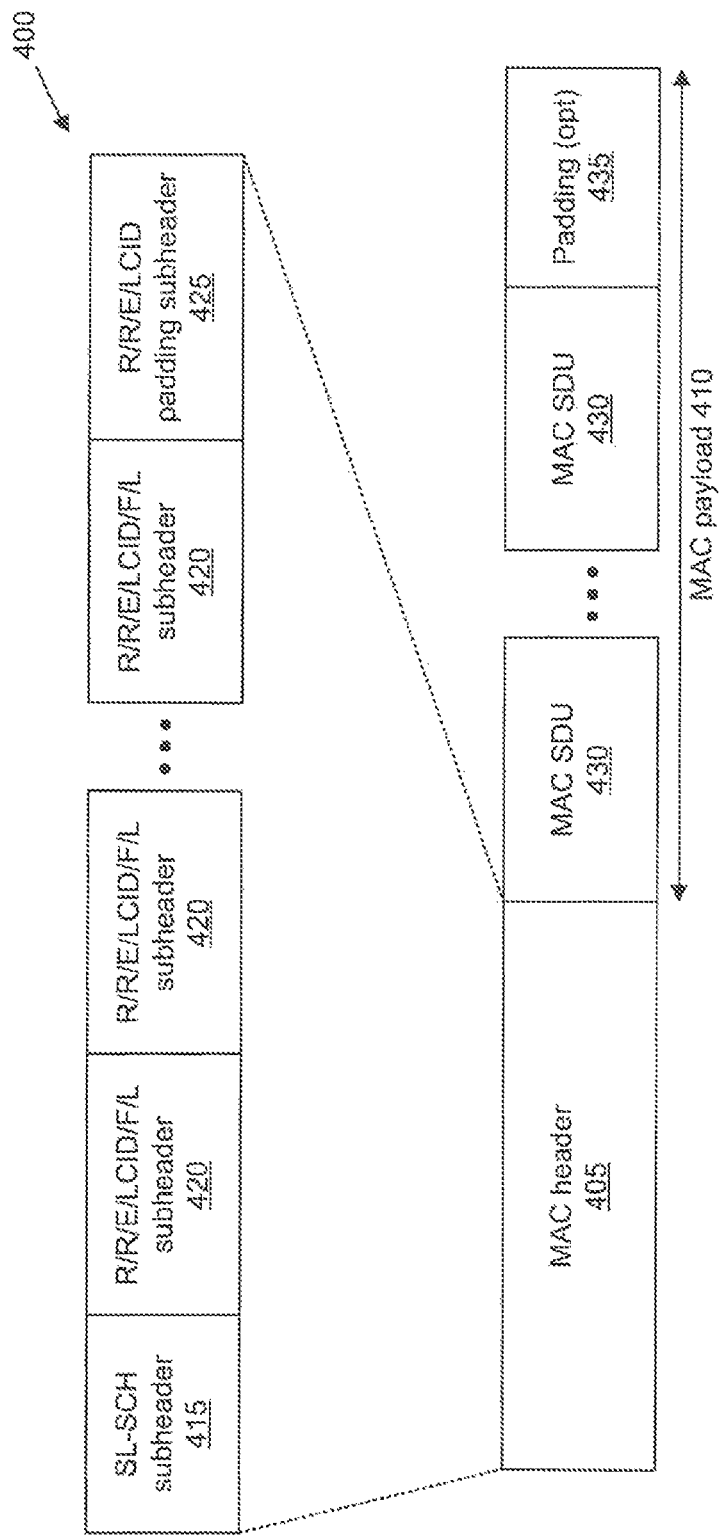
FIG. 4 is a diagram illustrating one embodiment of a V2X MAC PDU.

FIG. 4 depicts an example of a MAC PDU 400 according to embodiments of the disclosure. Here, the MAC PDU 400 consists of a MAC header 405 and a MAC payload 410 comprising multiple MAC SDUs 430 and (optionally) padding bits (e.g., so that the MAC PDU 400 achieves a fixed size). The MAC header 405 may be composed of a plurality of subheaders, including (but not limited to) a SL-SCH subheader 415 and a plurality of MAC PDU subheaders 420. Optionally, the MACH header 405 may include a padding subheader 425.

In various embodiments, the SL-SCH sub-header 415 may be the V2X MAC subheader 300 described above with reference to FIG. 3. The MAC PDU subheaders 420 each contain the fields R/R/E/LCID/F/L. A MAC PDU subheader corresponding to padding consists of the four header fields R/R/E/LCID. Here, the fields 'R' and are as described above. The field 'E' (Extension flag) indicates whether there is another set of fields following the subheader 420. The field ICID' (Logical Channel ID) indicates the logical channel number. In some embodiments, the ICID' field has a 5-bit length. The field 'F' (Format flag) may be used to indicate the length of the field. In various embodiments, the fields E, F and LCID have the same meaning as in 3GPP TS 36.321.

In certain embodiments, the two 'R' fields shown in the FIG. 4 may be used as Destination index of size 2 bits (i.e., total of 4 destinations possible). Here, the destination index (one out of 4) of the corresponding MAC SDU can be known from combining the two (bits) R bits. The first DST appearing in the V2X MAC subheader is the first index, the next DST appearing in the V2X MAC subheader is the second index, and so on. If V2X data for more than four destinations need to be multiplexed, then the two 'R' bits alone will not suffice, and a bigger Destination index field will be used. In one embodiment, further adjacent bits may be used shifting the next fields further.

In some embodiments of the first solution, the receiving-side MAC layer filters out (i.e., discards) any MAC SDUs that correspond to a destination that is not belonging to the Rx UE. The rest of the MAC SDU(s) (if any remain) are forwarded to the upper layers like Non Access Stratum ("NAS") or to the V2X layers including V2X application layer (e.g., Cooperative Awareness Messages ("CAM"), Decentralized Environmental Notification Messages ("DENM"), Basic Safety Message ("BSM"), etc.) directly or indirectly through intermediate layers.

As a first implementation of the first solution, more than one L1 IDs are carried in the SCI. This enables the receiving-side physical layer to filter out the irrelevant V2X transmission, i.e., transmissions not intended for the particular V2X UE (which could be just a V2X device). However, this first implementation can be signaling heavy.

As a second implementation of the first solution, only one L1 ID is carried in the SCI, which may be a dummy value when data for multiple destinations is multiplexed into the MAC TB. Here, the dummy value is (pre)configured or specified and is therefore known to both the Tx UE and to any possible Rx UE. The dummy value indicates to the Rx UE that the received TB is to be directly forwarded to the upper layers like NAS or to the V2X layers including V2X application layer (CAM, DENM, BSM), either directly or indirectly through intermediate layers; i.e., without performing any L1 filtering. Note that in certain embodiments a MAC entity may perform L1 filtering. For example, based on MAC subheader, the Rx UE will only forward the relevant data to higher layer.

Alternatively, and according to some addition implementation of the first solution, only one L1 ID is carried in the SCI and this ID may be a preconfigured or specified value which is known to the Tx UE and to any possible Rx UE. The preconfigured value may indicate that the received TB is to be forwarded to the MAC layer where a filtering is performed accordingly, e.g., based on the Destination ID(s) carried in the MAC header (as described above). A receiving-side MAC layer filters out (i.e., discards) the MAC SDUs that correspond to a destination that is not belonging to the Rx UE. Rest of (if any remaining) of the MAC SDU(s) shall be forwarded to the upper layers like NAS (Non Access Stratum) or to the V2X layers including V2X application layer (CAM, DENM, BSM) directly or indirectly through intermediate layers. However, the above implementations may be processing heavy as there is no filtering at L1 and the MAC layer needs to process all incoming packets received on PC5.

As a third implementation of the first solution, only one L1 ID is carried in the SCI and this is a combination of the individual L1 IDs. As an example of the simplest operation, in the case of two destinations multiplexed together, the L1 ID in SCI carries half of each of the individual L1 IDs (e.g. 4 MSBs/LSBs) appended together. The L1 layer, therefore, may perform some "partial" filtering at the L1 layer using the portions of the individual L1 IDs. As a variant, instead of appending the individual L1 IDs, a bitwise operation may be used, e.g., where the first and second L1 IDs are put together using one or more of the bitwise operations like OR, AND, XOR, etc. This third implementation, therefore, is a middle ground of the two earlier implementations of the first solution.

According to a second solution, the UE 205 determines the MCR associated with a TB transmitted on the SL PSSCH as the MCR associated with the highest priority SL LCH for which a MAC SDU is contained in the TB. One example of MCR determination according to the second solution is discussed above with reference to multiplexing scheme 280 of FIG. 2. Note that the second solution may apply both to MAC TBs with a single destination and MAC TBs multiplexing multiple destinations, as discussed above with reference to the first solution.

In the second solution, the TB formation itself may be done irrespective of the MCR of the MAC SDUs (i.e., LCP is done before MCR determination). In various embodiments, the TB formation is in accordance to the LCP procedure described in 3GPP TS 36.321 for SL and/or according to the LCP procedure for Uu described in 3GPP TS 38.321 and adapted for V2X, i.e., respecting other LCH restrictions that may be introduced for V2X LCH. As discussed above, the UE 205 may signal the determined MCR in the Sidelink Control Information ("SCI") signaled corresponding to the TB on the SL PSSCH. It is assumed that the MAC SDU of the highest priority SL LCH, i.e., SL LCH having the highest logical channel priority, is multiplexed first in the TB except for some potential MAC CEs.

As a variation, instead of logical channel priority, any characteristic of a PQI like latency, priority or others can be used as a basis to determine the so-called "highest priority" LCH whose corresponding MCR may be used and signaled to the Rx UE(s).

According to a third solution, the MCR determination is done first of all (i.e., made prior to TB generation) by taking the MCR of the highest priority logical channel among LCH(s) having data available for transmission. The third solution may apply both to MAC TBs with a single destination and MAC TBs multiplexing multiple destinations, as discussed above with reference to the first solution.

According to one implementation of the third solution, the UE 205 is only allowed to multiplex MAC SDUs of SL LCH(s) in a TB which have the same associated MCR as the MCR determined for this transport block. During LCP procedure (i.e., TB generation procedure) the UE 205 determines in a first step the MCR associated with the TB, e.g., the MCR of a highest priority SL LCH having data available for transmission. In a second step, the UE 205 selects all SL LCHs having data available for transmissions whose associated MCR is same as the MCR determined in the first step. The sidelink resources are shared among the selected SL LCH(s), i.e., LCP procedure is performed among the selected SL LCHs as usual, e.g., like is done for Uu but considering the LCH restrictions applicable to a Sidelink Logical Channel.

According to one alternative implementation of the third solution, the UE 205 is only allowed to multiplex MAC SDUs of SL LCH(s) in a TB which have the same or smaller to associated MCR than the MCR determined for this transport block. During LCP procedure (i.e., TB generation procedure) the UE 205 determines in a first step the MCR associated with the TB according to above described implementation, i.e., the MCR of highest priority SL LCH having data available for transmission. In a second step, the UE 205 selects all SL LCHs having data available for transmissions whose associated MCR is same or smaller than the MCR determined in the first step. The sidelink resources are shared among the selected SL LCH(s), i.e., LCP procedure is performed among the selected SL LCHs as usual.

According to one additional aspect of the third solution, MAC CE(s) have no associated MCR and can be multiplexed in a TB regardless of the "determined MCR" of a TB. Note that the third solution differs from the second solution in when the MCR is determined (i.e., before LCP procedure or afterwards).

According to a fourth solution, the UE 205 first performs the LCP and TB formation and then determines the MCR associated with the generated TB as the highest MCR (i.e., longest distance) among the SL LCHs of which MAC SDUs are multiplexed in this TB. One example of MCR determination according to the fourth solution is discussed above with reference to multiplexing scheme 270 of FIG. 2. Note that the fourth solution may apply both to MAC TBs with a single destination and MAC TBs multiplexing multiple destinations, as discussed above with reference to the first solution.

According to one implementation of the solution, the UE 205 generates the TB, i.e. performing LCP procedure, and determines for the generated TB the associated MCR based on the MCR(s) associated with the SL LCH(s) being multiplexed in the generated TB. Here, the UE 205 selects the highest MCR among the MCR(s) multiplexed within the TB. The UE 205 may signal the determined MCR of the TB within the SCI.

In various embodiments, if HARQ feedback is enabled for groupcast and the transmitter UE 205's location information is available, then the transmitter UE 205 sets the communication range to the value of the longest communication range of the logical channel(s) in the MAC PDU.

According to a fifth solution, the UE 205 determines the MCR of the combined TB using one or more of an arithmetic mean, median or mode of the MCR values corresponding to the LCH(s) that are part of the said TB. Similar to the second and fourth solutions, the TB generation is done irrespective of the MCR of the MAC SDUs (i.e., LCP is done before MCR determination). Next, the UE 205 determines for the generated TB the associated MCR based on the arithmetic mean, median and/or mode of the MCR values corresponding to the MAC SDUs forming the TB. Note that the fifth solution may apply both to MAC TBs with a single destination and MAC TBs multiplexing multiple destinations, as discussed above with reference to the first solution.

According to a sixth solution, if there are more than one destination multiplexed together in the same TB, the UE 205 determines the MCR in the same way as any (or all) of the above disclosed embodiments, regardless of the corresponding Destination ID, i.e., assuming as if all the data available for transmission from any of the LCH actually belonged to the same destination. In other words, the second, third, fourth and fifth solutions may apply both to MAC TBs with a single destination and MAC TBs multiplexing multiple destinations, as discussed above with reference to the first solution.

According to a seventh solution, if multiple destinations are multiplexed together in the same TB, the MCR determination is only guided by highest priority destination. In one embodiment, the seventh solution applies when a destination priority has been signaled from any of the upper layers, including V2X application and sub-layers. After identifying a highest priority destination, the MCR may be determined based on any of the longest MCR of a MAC SDU for the highest priority destination, the MCR of a highest priority LCH for the highest priority destination, or an averaged MCR considering only the highest priority destination, etc. according to the concepts described above in the second, fourth and fifth solutions.

According to an eight solution, if multiple destinations are multiplexed together in the same TB and if data for more than one cast type (Unicast, Groupcast and/or Broadcast traffic) is multiplexed in the same TB, then the MCR determination is only guided by highest priority cast-type. Here, the UE 205 may determine the L1 identity as in some of the implementations of the first embodiment. Further, the priority of the cast-type may be specified or (pre)configured. For example, if Broadcast traffic has a higher priority than Groupcast traffic, which both have higher priority than Unicast traffic, then MCR for the included Broadcast traffic may be used. After identifying a highest priority cast-type, the MCR may be determined based on any of the longest MCR of a MAC SDU for the highest priority cast-type, the MCR of a highest priority LCH for the highest priority cast-type, or an averaged MCR considering only the highest priority cast-type, etc. according to the concepts described above in the second, fourth and fifth solutions.

In all the above embodiments, it is assumed that each LCH carries only packets with same MCR (otherwise MAC has to inspect every MAC SDU), thus an MCR is associated with each SL LCH. According to a ninth solution, MCR is configured for a SL LCH when SL LCH is established (for mode 1). Here, MCR is attached to each packet coming from higher layer and the UE 205 associated the packet with a corresponding SL radio bearer/SL LCH (similar to LTE V2X). According to a ninth solution, the UE only puts packets with same MCR in a given SL LCH/SL radio bearer.

In various embodiments, the transmitter UE 205 is able to request HARQ feedback for certain TBs based on the QoS priority and/or the MCR range. In that case, a MAC TB may be formed by only permitting the MAC layer to multiplex data from one or more LCH(s) that require HARQ feedback and an SCI indicates that a HARQ feedback is required for the TB. Conversely, a MAC TB may be formed by multiplexing data from one or more LCH(s) that did not require any HARQ feedback. The technique is applicable to the Tx UE 205 transmitting data to one or more destinations. The UE 205 can multiplex data to form a MAC TB from different LCH(s) having same MCR value and require HARQ feedback, otherwise the UE 205 can multiplex data from different LCH(s) having different MCR but require HARQ feedback.

In various embodiments, a logical channel configured with parameter sl-HARQ-FeedbackEnabled set to 'enabled' and a logical channel configures with parameter sl-HARQ-FeedbackEnabled set to 'disabled' cannot be multiplexed into the same MAC PDU.

In certain embodiments, determining whether HARQ feedback is required is based on the number of Rx UEs configured to receive communications from the UE 205. For example, if a number of target Rx UEs (e.g., irrespective of cast-type) is less than a predetermined number "N", then the UE 205 may request HARQ feedback. Moreover, if the number of target Rx UEs is greater than or equal to N, then the UE 205 may not request HARQ feedback. The number N may be predefined or configured. In further embodiments, determining whether HARQ feedback is requested is based on one or more of the following factors: a communication range corresponding to the V2X UEs; a latency corresponding to the V2X UEs; and/or a quality of service parameter corresponding to the V2X UEs. In one embodiment, these factors may be part of a policy.

In some embodiments, the UE 205 (transmitter UE) counts the number of HARQ responses and determines a number of DTX Rx UEs if not all Rx UEs responded for a first transmission. For a retransmission, the transmitter UE determines a number of DTX receiver UEs if not all receiver UEs that provided specific HARQ NACK in response to the first transmission responded with HARQ feedback. The transmitter must remember which UE provided NACK feedback in the previous transmission and/or retransmission to properly determine a number of DTX receiver UEs.

In another embodiment, irrespective of transmission or retransmission, the transmitter determines a number of DTX receiver UEs if not all receiver UEs responded (e.g., didn't send ACK or NACK).

According to a tenth solution, the UE 205 triggers/sends a buffer status report and initiates acquisition of a Mode-2 grant only when there is at least one Rx UE for the corresponding communication as informed by the upper layer using PC5 communication protocol or something similar. Here, the upper layers inform the access stratum ("AS") about the number of Rx UE(s).

The number of Rx UEs may be determined by an application level discovery, a physical layer discovery, and/or a sensing procedure. The application level discovery may be performed by an application level (e.g., V2X applications, V2X layer) determining the number of SL UEs in a group and internally informing an access stratum. The physical layer discovery may be performed by a discovery mechanism at the physical layer sending a request to sidelink devices (e.g., "Who is there?" request).

The sensing procedure may be performed as an extension of a sensing procedure performed by SCI decoding. For example, each sidelink device may share its own geolocation information, relative location information, or some part of geolocation information that identifies either a relative or an absolute position of a UE (e.g., a current zone ID) in its SCI, and the remote unit 102 may decode the sidelink devices SCI as part of a continuous sensing procedure. Moreover, the remote unit 102 may determine a relative distance between the remote unit 102 and the sidelink devices and may determine a number of sidelink devices within a certain vicinity. The remote unit may only include sidelink devices that have a certain level of a QoS parameter (e.g., minimum communication parameter).

Additionally, based on the knowledge of total number of member UEs in the group, the Physical layer of the Tx UE 205 may determine the amount of feedback resources required. The determination of required feedback resources will be according to the Physical layer structure still to be finalized in 3GPP. The transmitter UE, having made this determination, will compare the number of group member UEs, amount of feedback resources available and the reliability required for a particular V2X message. The reliability is directly derivable from the PQI/priority indicated by Upper layer for the corresponding Packet for transmission. As an example, if the reliability required is 5 '9s' e.g., as for "Emergency trajectory alignment between UEs supporting V2X application" and "Sensor information sharing between UEs supporting V2X application scenarios" then only feedback Option 2 must be used. For lesser-required reliability, Option 1 alone can be used if the total number of member UEs in the group is higher compared with available feedback resources; or, a mix of Option 1 and Option 2 can be used.

The actual utilized resources for HARQ feedback can be less compared to what has been determined by the transmitter, as indicated above. This is since only the receiver UE(s) that are inside the MCR (Minimum Communication Range) are required to provide the HARQ feedback. This may at first sound like a resource wastage but indeed avoids much complexity that would arise if the transmitter had to beforehand know the real-time distance of each of the receiver UE.

A detailed (transmitter) UE behavior is revealed for selecting between Option 1, Option 2 (or a mix) considering the following three aspects: 1) total number of member UEs in the group, 2) amount of available HARQ feedback resources, and 3) reliability required for corresponding V2X PSSCH packet transmission. A different threshold for each of those items may lead to a combination that uses either option or uses a certain mix of these.

As a first example, if Reliability>Threshold_reliability, then use Option 2 for as many UEs as possible. In case of shortage of feedback resources use Option 1 for remaining UEs, closer to the transmitter—based on distance_threshold. The distance_threshold is calculated as a ratio of remaining UEs to the total receiver UEs in the group multiplied by MCR (Minimum Communication Range).

As a second example, if Reliability<Threshold_reliability and number of total receiver UEs in the group is more than threshold_max_option2, then use Option 1.

In Mode-1 V2X communication (i.e., network-scheduled NR-based V2X), the transmitter UE needs to ask for the feedback resources from the gNB in addition to (re)transmission resources. For this reason, the transmitter UE needs to inform the gNB on the number of member UEs in the group destination where the transmitter would like to send intended V2X message(s). This information along with the size of the V2X message, periodicity etc. needs to be informed to the gNB for each of the group destination where the transmitter intends to make transmissions. This information can be carried in messages similar to Sidelink UE information and/or NR UE Assistance information as defined in LTE RRC specification (i.e., 3GPP TS 36.331). These messages carry the number of member UEs in a group, corresponding size of the V2X message, periodicity, priority/VQI etc. for each group where a transmitter is interested in transmitting data to the gNB.

An eleventh solution is described herein defining prioritization rules for the case of a collision, e.g., in time domain, between a sidelink transmission and an uplink transmission (Uu interface). Based on UE capability, the UE 205 may not be able to perform both the sidelink transmission and the uplink transmission at same time. Therefore, some prioritization between sidelink and uplink is required.

According to one implementation of the eleventh solution, the prioritization is determined based on the QoS of the SL transmission and the uplink transmission on Uu, i.e., QoS of the data contained in the SL TB and Uu TB. In one implementation, there are two thresholds configured or preconfigured, one for the SL data/QoS and one for the Uu data/QoS. Prioritization rules are defined based on the two thresholds.

For example, in case the SL data has a QoS priority (PQI value) lower than the SL related threshold (lower PQI value indicates a higher QoS priority) and the Uu data is above the Uu related threshold (indicating a less demanding QoS for the Uu data) than the SL data transmission shall be prioritized over the Uu transmission. For cases when SL TB contains data with high QoS priority (PQI value below the threshold) as well as the Uu TB contains data with high QoS demands (QCI value below the threshold) the Uu data may be prioritized according to one possible implementation.

In various embodiments, for regular and periodic SL-BSR, the MAC entity shall:

If the parameter sl-PrioritizationThres is configured and the value of the highest priority of the logical channels that belong to and logical channel group ("LCG") and contain SL data for any Destination is lower than the value of parameter sl-PrioritizationThres; and If either 1) the parameter ul-PrioritizationThres is not configured or 2) the parameter ul-P rioritizationThres is configured and the value of the highest priority of the logical channels that belong to any LCG and contain UL data is equal to or higher than the value of parameter ul-PrioritizationThres is not configured, then the LCG(s) for the (e.g., SL) Destination(s).

If the Buffer Status reporting procedure determines that at least one BSR (i.e., indicating an amount of data in a LCH buffer) has been triggered and not cancelled and the UL grant cannot accommodate a SL-BSR MAC CE containing buffer status only for all prioritized LCGs having data available for transmission plus the subheader of the SL-BSR, in case the SL-BSR is considered as not prioritized, then the UE 205 prioritizes the SL-BSR for logical channel prioritization and reports truncated SL-BSR containing buffer status for as many prioritized LCGs having data available for transmission as possible, taking the number of bits in the UL grant into consideration.

When multiple QoS flows are multiplexed into one SL LCH, the corresponding QoS value/priority respectively the associated PQI value of an LCH needs to be defined. According to one potential implementation the most demanding QoS flow, e.g. flow with lowest PQI value, determines the QoS value of a SL LCH. Note that in various embodiments, a lower QoS priority value indicates higher priority data.

Similarly for cases when data of multiple SL LCH(s) is multiplexed in a SL TB, the QoS priority/value of the TB is determined based on the QoS value of the highest demanding SL LCH within a SL TB, e.g. lowest PQI value among the SL LCH(s) within a TB determines the QoS priority/value of the TB is signaled as the priority value in the SCI (PSCCH) and is used for SL/UL prioritization.

Figure 5:
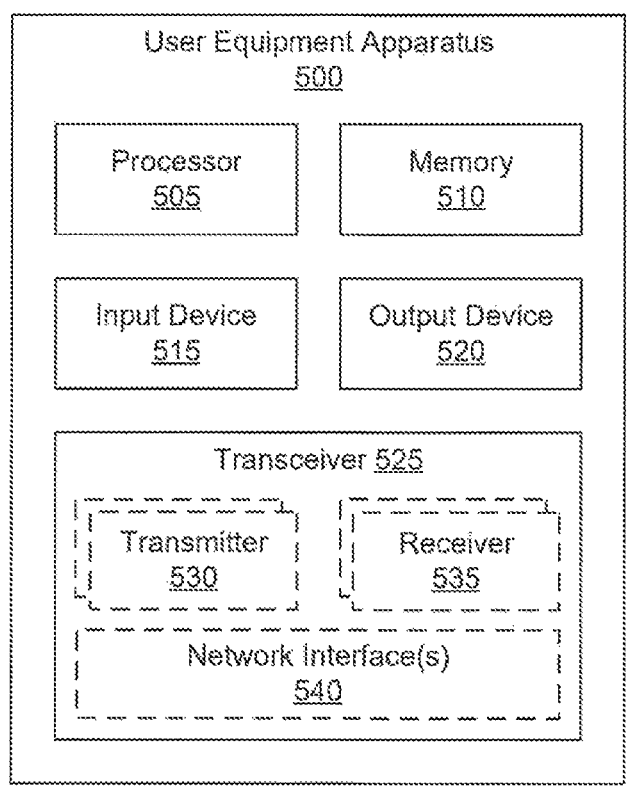
FIG. 5 is a diagram illustrating one embodiment of a user equipment apparatus that may be used for MAC TB formation and MCR selection.

FIG. 5 depicts a user equipment apparatus 500 that may be used for MAC TB formation and MCR selection for V2X communication, according to embodiments of the disclosure. In various embodiments, the user equipment apparatus 500 is used to implement one or more of the solutions described above. The user equipment apparatus 500 may be one embodiment of the remote unit 105 and/or the UE 205, described above. Furthermore, the user equipment apparatus 500 may include a processor 505, a memory 510, an input device 515, an output device 520, and a transceiver 525.

In some embodiments, the input device 515 and the output device 520 are combined into a single device, such as a touchscreen. In certain embodiments, the user equipment apparatus 500 may not include any input device 515 and/or output device 520. In various embodiments, the user equipment apparatus 500 may include one or more of: the processor 505, the memory 510, and the transceiver 525, and may not include the input device 515 and/or the output device 520.

As depicted, the transceiver 525 includes at least one transmitter 530 and at least one receiver 635. Here, the transceiver 525 communicates with one or more base units 110 and/or with one or more UEs (e.g., remote unit 105). Additionally, the transceiver 525 may support at least one network interface 540. In some embodiments, the transceiver 525 supports a first interface (e.g., a Uu interface) for communicating with a base unit (e.g., gNB) over an access network and a second interface (e.g., a PC5 interface) that communicates directly with a UE over a direct channel.

The processor 505, in one embodiment, may include any known controller capable of executing computer-readable instructions and/or capable of performing logical operations. For example, the processor 505 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 505 executes instructions stored in the memory 510 to perform the methods and routines described herein. The processor 505 is communicatively coupled to the memory 510, the input device 515, the output device 520, and the transceiver 525.

In various embodiments, the processor 505 controls the user equipment apparatus 500 to implement the above described UE behaviors. In some embodiments, the processor 505 identifies SL LCH data having different MCR and multiplexes the SL LCH data having different MCR into a same MAC TB. The processor 505 controls the transceiver 525 to transmit the MAC TB according to a longest MCR among the SL LCHs included in the MAC TB.

In some embodiments, multiplexing the SL LCH data includes multiplexing V2X LCH data having different destinations into the same MAC TB. In some embodiments, multiplexing the SL LCH data includes multiplexing SL LCH data having the same length or shorter MCR as the MCR of the highest priority LCH. In some embodiments, the MAC TB further multiplexes at least one MAC CE, wherein the at least one MAC CE is not associated with an MCR.

In some embodiments, the MCR is configured for a SL LCH when the SL LCH is established. In certain embodiments, the MCR is indicated (i.e., internally) by higher layer to the access stratum for each QoS flow. In some embodiments, the processor 505 indicates in SCI the longest MCR among the SL LCHs included in the MAC TB.

In some embodiments, the SL data for the MAC TB is selected from a plurality of LCHs. In such embodiments, the processor 505 determines whether each LCH requires HARQ feedback. In certain embodiments, the processor 505 multiplexes the SL LCH data into the same MAC TB by multiplexing data only from LCHs that require HARQ feedback. In other embodiments, the processor 505 multiplexes the SL LCH data into the same MAC TB by multiplexing data only from LCHs that do not require HARQ feedback.

In various embodiments, the processor 505 detects a time-domain collision between a SL transmission and a UL transmission. Here, the user equipment apparatus 500 does not support simultaneous transmission on both SL and UL. The processor 505 identifies a QoS priority of the SL transmission and identifies a QoS priority of the UL transmission. Additionally, the processor 505 prioritizes the SL transmission over the UL transmission in response to the QoS priority of the SL transmission being less than a SL priority threshold and the QoS priority of the UL transmission not being less than a UL priority threshold.

In some embodiments, the processor 505 prioritizes the UL transmission over the SL transmission in response to the QoS priority of the UL transmission being less than a UL priority threshold. In some embodiments, data from multiple SL LCHs is available and is multiplexed into the SL transmission. In such embodiments, the processor 505 identifies the QoS priority of the SL transmission by selecting a priority value of the highest priority SL LCH.

In some embodiments, data from multiple UL LCHs is available and is multiplexed into the UL transmission. In such embodiments, where identifying the QoS priority of the UL transmission comprises selecting a priority value of the highest priority UL LCH. In various embodiments, the processor 505 signals the selected priority value in SCI transmitted on a PSCCH. In certain embodiments, a lower QoS priority value indicates higher priority data.

In various embodiments, the processor 505 identifies LCH data for V2X having different destinations and multiplexes the LCH data for V2X having different destinations into a same MAC TB. The transceiver 525 that transmits the MAC TB according to a common MCR.

In some embodiments, the MAC TB comprises multiple Layer-2 identities corresponding to the different destinations. In some embodiments, a single Layer-1 identity containing a portion of a Layer-2 identities corresponding to the different destinations is passed on the physical layer. In some embodiments, a special Layer-1 identity is used in SCI that indicates that Layer-1 filtering is to be skipped for the MAC TB. In such embodiments, the processor 505 controls the transceiver 525 to transmit the SCI.

In some embodiments, the processor 505 determines the common MCR of the MAC TB in response to multiplexing the LCH data for V2X having different destinations. In certain embodiments, the common MCR is determined corresponding to highest priority sidelink LCH included in the MAC TB. In certain embodiments, the common MCR is determined as the MCR of the LCH having the longest MCR among the LCHs included in the TB.

In some embodiments, the common MCR is determined without consideration of a destination of the MAC TB. In some embodiments, the common MCR is determined considering only a highest priority destination of the MAC TB. In some embodiments, the common MCR is determined considering a highest priority cast-type of the MAC TB.

In various embodiments, the processor 505 multiplexes SL LCH data having different MCR into a same MAC TB and identifies a highest priority SL LCH the having SL LCH data included in the MAC TB. The transceiver 525 that transmits the MAC TB according to the MCR of the highest priority SL LCH.

The memory 510, in one embodiment, is a computer readable storage medium. In some embodiments, the memory 510 includes volatile computer storage media. For example, the memory 510 may include a RAM, including dynamic RAM ("DRAM"), synchronous dynamic RAM ("SDRAM"), and/or static RAM ("SRAM"). In some embodiments, the memory 510 includes non-volatile computer storage media. For example, the memory 510 may include a hard disk drive, a flash memory, or any other suitable non-volatile computer storage device. In some embodiments, the memory 510 includes both volatile and non-volatile computer storage media.

In some embodiments, the memory 510 stores data related to MAC TB formation and MCR selection. For example, the memory 510 may store LCH data, MAC PDUs, TBs, LCP results, MCR, and the like. In certain embodiments, the memory 510 also stores program code and related data, such as an operating system or other controller algorithms operating on the remote unit 105.

The input device 515, in one embodiment, may include any known computer input device including a touch panel, a button, a keyboard, a stylus, a microphone, or the like. In some embodiments, the input device 515 may be integrated with the output device 520, for example, as a touchscreen or similar touch-sensitive display. In some embodiments, the input device 515 includes a touchscreen such that text may be input using a virtual keyboard displayed on the touchscreen and/or by handwriting on the touchscreen. In some embodiments, the input device 515 includes two or more different devices, such as a keyboard and a touch panel.

The output device 520, in one embodiment, is designed to output visual, audible, and/or haptic signals. In some embodiments, the output device 520 includes an electronically controllable display or display device capable of outputting visual data to a user. For example, the output device 520 may include, but is not limited to, an LCD display, an LED display, an OLED display, a projector, or similar display device capable of outputting images, text, or the like to a user. As another, non-limiting, example, the output device 520 may include a wearable display separate from, but communicatively coupled to, the rest of the user equipment apparatus 500, such as a smart watch, smart glasses, a heads-up display, or the like. Further, the output device 520 may be a component of a smart phone, a personal digital assistant, a television, a table computer, a notebook (laptop) computer, a personal computer, a vehicle dashboard, or the like.

In certain embodiments, the output device 520 includes one or more speakers for producing sound. For example, the output device 520 may produce an audible alert or notification (e.g., a beep or chime). In some embodiments, the output device 520 includes one or more haptic devices for producing vibrations, motion, or other haptic feedback. In some embodiments, all or portions of the output device 520 may be integrated with the input device 515. For example, the input device 515 and output device 520 may form a touchscreen or similar touch-sensitive display. In other embodiments, the output device 520 may be located near the input device 515.

The transceiver 525 includes at least transmitter 530 and at least one receiver 535. One or more transmitters 530 may be used to provide UL communication signals to a base unit 100, such as the UL transmissions described herein. Similarly, one or more receivers 535 may be used to receive DL communication signals from the base unit 100, as described herein. Although only one transmitter 530 and one receiver 535 are illustrated, the user equipment apparatus 500 may have any suitable number of transmitters 530 and receivers 535. Further, the transmitter(s) 530 and the receiver(s) 535 may be any suitable type of transmitters and receivers. In one embodiment, the transceiver 525 includes a first transmitter/receiver pair used to communicate with a mobile communication network over licensed radio spectrum and a second transmitter/receiver pair used to communicate with a mobile communication network over unlicensed radio spectrum.

In certain embodiments, the first transmitter/receiver pair used to communicate with a mobile communication network over licensed radio spectrum and the second transmitter/receiver pair used to communicate with a mobile communication network over unlicensed radio spectrum may be combined into a single transceiver unit, for example a single chip performing functions for use with both licensed and unlicensed radio spectrum. In some embodiments, the first transmitter/receiver pair and the second transmitter/receiver pair may share one or more hardware components. For example, certain transceivers 525, transmitters 530, and receivers 535 may be implemented as physically separate components that access a shared hardware resource and/or software resource, such as for example, the network interface 540.

In various embodiments, one or more transmitters 530 and/or one or more receivers 535 may be implemented and/or integrated into a single hardware component, such as a multi-transceiver chip, a system-on-a-chip, an ASIC, or other type of hardware component. In certain embodiments, one or more transmitters 530 and/or one or more receivers 535 may be implemented and/or integrated into a multi-chip module. In some embodiments, other components such as the network interface 540 or other hardware components/circuits may be integrated with any number of transmitters 530 and/or receivers 535 into a single chip. In such embodiment, the transmitters 530 and receivers 535 may be logically configured as a transceiver 525 that uses one more common control signals or as modular transmitters 530 and receivers 535 implemented in the same hardware chip or in a multi-chip module.

Figure 6:
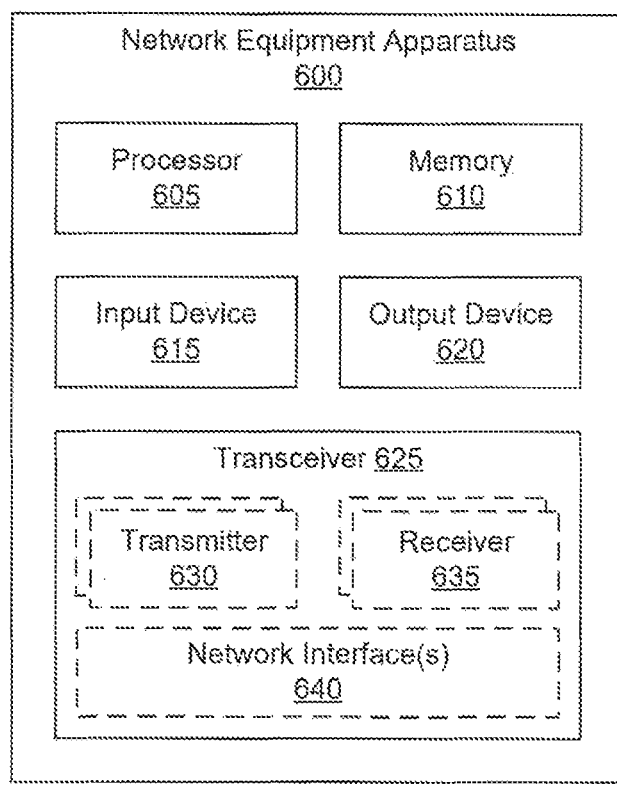
FIG. 6 is a diagram illustrating one embodiment of a network equipment apparatus that may be used for MAC TB formation and MCR selection.

FIG. 6 depicts one embodiment of a network equipment apparatus 600 that may be used for MAC TB formation and MCR selection, according to embodiments of the disclosure. In some embodiments, the network equipment apparatus 600 may be one embodiment of the base unit 121 and/or the RAN node 305. Furthermore, network equipment apparatus 600 may include a processor 605, a memory 610, an input device 615, an output device 620, a transceiver 625. In some embodiments, the input device 615 and the output device 620 are combined into a single device, such as a touch screen. In certain embodiments, the network equipment apparatus 600 does not include any input device 615 and/or output device 620.

As depicted, the transceiver 625 includes at least one transmitter 630 and at least one receiver 635. Here, the transceiver 625 communicates with one or more remote units 105. Additionally, the transceiver 625 may support at least one network interface 640. In some embodiments, the transceiver 625 supports a first interface (e.g., a Uu interface) for communicating with a remote unit (e.g., UE) over an access network, a second interface (e.g., an N2 interface) that communicates with control-plane functions (e.g., SMF) in a mobile core network (e.g., a 5GC), and a third interface (e.g., an N3 interface) that communicates with a user-plane function (e.g., UPF) in the mobile core network.

The processor 605, in one embodiment, may include any known controller capable of executing computer-readable instructions and/or capable of performing logical operations. For example, the processor 605 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 605 executes instructions stored in the memory 610 to perform the methods and routines described herein. The processor 605 is communicatively coupled to the memory 610, the input device 615, the output device 620, and the transceiver 625.

In various embodiments, the processor 605 controls the network equipment apparatus 600 to implement the above described RAN node behaviors. For example, the transceiver 625 may receive a scheduling request from a V2X UE operating in Mode-1 (or Mode-3) and the processor 605 may allocate SL resources to the requesting V2X UE.

The memory 610, in one embodiment, is a computer readable storage medium. In some embodiments, the memory 610 includes volatile computer storage media. For example, the memory 610 may include a RAM, including dynamic RAM ("DRAM"), synchronous dynamic RAM ("SDRAM"), and/or static RAM ("SRAM"). In some embodiments, the memory 610 includes non-volatile computer storage media. For example, the memory 610 may include a hard disk drive, a flash memory, or any other suitable non-volatile computer storage device. In some embodiments, the memory 610 includes both volatile and non-volatile computer storage media.

In some embodiments, the memory 610 stores data relating to MAC TB formation and MCR selection, for example storing subscriber identities, SL grants, and the like. In certain embodiments, the memory 610 also stores program code and related data, such as an operating system ("OS") or other controller algorithms operating on the network equipment apparatus 600 and one or more software applications.

The input device 615, in one embodiment, may include any known computer input device including a touch panel, a button, a keyboard, a stylus, a microphone, or the like. In some embodiments, the input device 615 may be integrated with the output device 620, for example, as a touchscreen or similar touch-sensitive display. In some embodiments, the input device 615 includes a touchscreen such that text may be input using a virtual keyboard displayed on the touchscreen and/or by handwriting on the touchscreen. In some embodiments, the input device 615 includes two or more different devices, such as a keyboard and a touch panel.

The output device 620, in one embodiment, may include any known electronically controllable display or display device. The output device 620 may be designed to output visual, audible, and/or haptic signals. In some embodiments, the output device 620 includes an electronic display capable of outputting visual data to a user. For example, the output device 620 may include, but is not limited to, an LCD display, an LED display, an OLED display, a projector, or similar display device capable of outputting images, text, or the like to a user. As another, non-limiting, example, the output device 620 may include a wearable display such as a smart watch, smart glasses, a heads-up display, or the like. Further, the output device 620 may be a component of a smart phone, a personal digital assistant, a television, a table computer, a notebook (laptop) computer, a personal computer, a vehicle dashboard, or the like.

In certain embodiments, the output device 620 includes one or more speakers for producing sound. For example, the output device 620 may produce an audible alert or notification (e.g., a beep or chime). In some embodiments, the output device 620 includes one or more haptic devices for producing vibrations, motion, or other haptic feedback. In some embodiments, all or portions of the output device 620 may be integrated with the input device 615. For example, the input device 615 and output device 620 may form a touchscreen or similar touch-sensitive display. In other embodiments, all or portions of the output device 620 may be located near the input device 615.

As discussed above, the transceiver 625 may communicate with one or more remote units and/or with one or more interworking functions that provide access to one or more PLMNs. The transceiver 625 may also communicate with one or more network functions (e.g., in the mobile core network 140). The transceiver 625 operates under the control of the processor 605 to transmit messages, data, and other signals and also to receive messages, data, and other signals. For example, the processor 605 may selectively activate the transceiver (or portions thereof) at particular times in order to send and receive messages.

The transceiver 625 may include one or more transmitters 630 and one or more receivers 635. In certain embodiments, the one or more transmitters 630 and/or the one or more receivers 635 may share transceiver hardware and/or circuitry. For example, the one or more transmitters 630 and/or the one or more receivers 635 may share antenna(s), antenna tuner(s), amplifier(s), filter(s), oscillator(s), mixer(s), modulator/demodulator(s), power supply, and the like. In one embodiment, the transceiver 625 implements multiple logical transceivers using different communication protocols or protocol stacks, while using common physical hardware.

Figure 7:
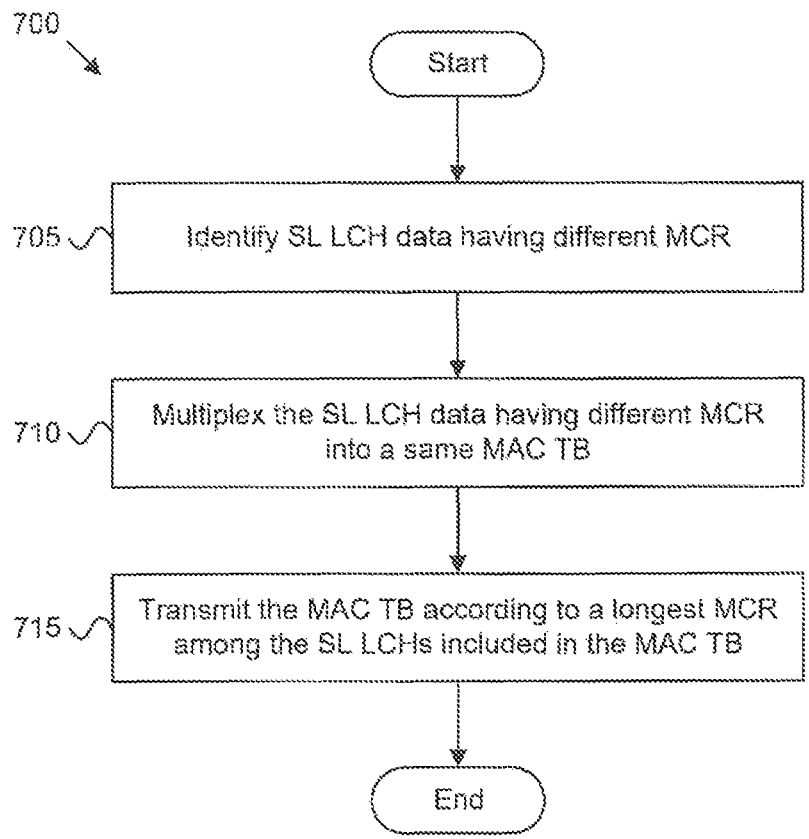
FIG. 7 is a flowchart diagram illustrating one embodiment of a first method that may be used for MAC TB formation and MCR selection.

FIG. 7 depicts one embodiment of a method 700 for MAC TB formation and MCR selection, according to embodiments of the disclosure. In various embodiments, the method 700 is performed by a UE, such as the remote unit 105, the UE 205, and/or the user equipment apparatus 500, described above. In some embodiments, the method 700 is performed by a processor, such as a microcontroller, a microprocessor, a CPU, a GPU, an auxiliary processing unit, a FPGA, or the like.

The method 700 begins and identifies 705 SL LCH data having different MCR. The method 700 includes multiplexing 710 the SL LCH data having different MCR into a same MAC TB. The first method includes transmitting 715 the MAC TB according to a longest MCR among the SL LCHs included in the MAC TB. The method 700 ends.

Figure 8:
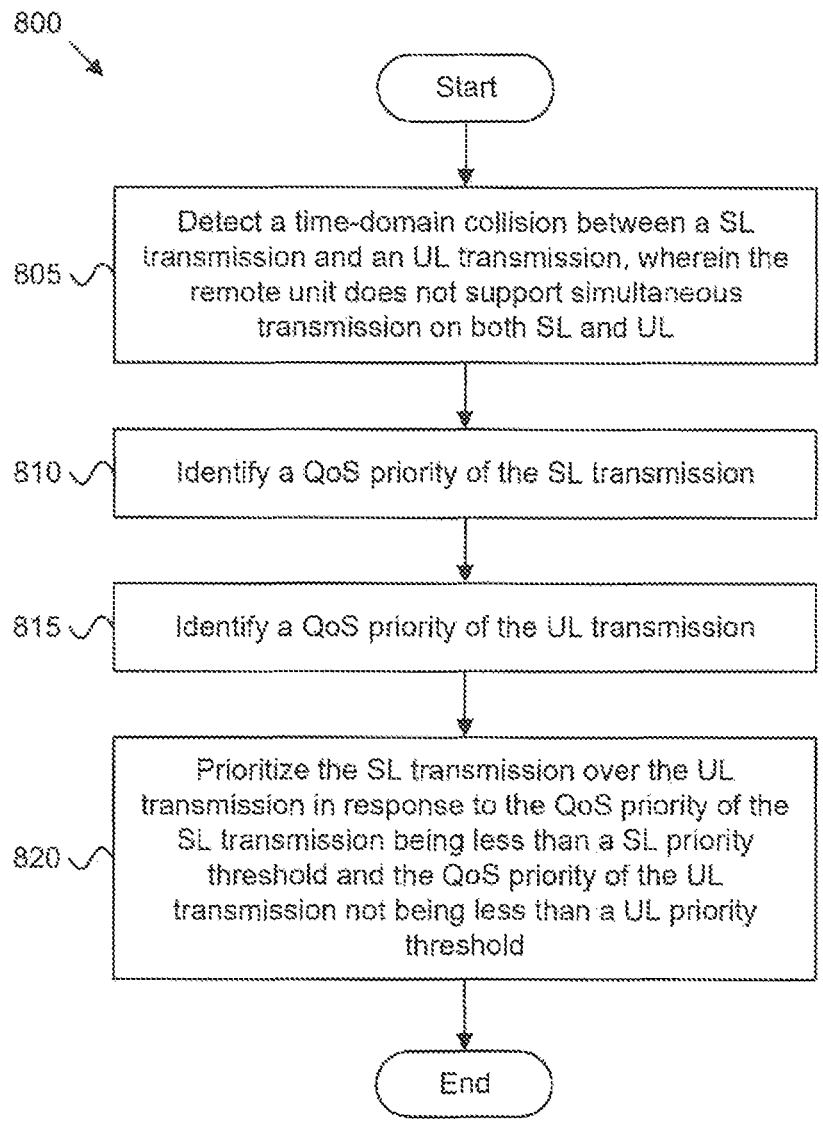
FIG. 8 is a flowchart diagram illustrating one embodiment of a second method that may be used for MAC TB formation and MCR selection.

FIG. 8 depicts one embodiment of a method 800 for MAC TB formation and MCR selection, according to embodiments of the disclosure. In various embodiments, the method 800 is performed by a UE, such as the remote unit 105, the UE 205, and/or the user equipment apparatus 500, described above. In some embodiments, the method 800 is performed by a processor, such as a microcontroller, a microprocessor, a CPU, a GPU, an auxiliary processing unit, a FPGA, or the like.

The method 800 begins and detects 805 a time-domain collision between a SL transmission and an UL transmission, where the remote unit does not support simultaneous transmission on both SL and UL. The method 800 includes identifying 810 a QoS priority of the SL transmission. The method 800 includes identifying 815 a QoS priority of the UL transmission. The method 800 includes prioritizing 820 the SL transmission over the UL transmission in response to the QoS priority of the SL transmission being less than a SL priority threshold and the QoS priority of the UL transmission not being less than a UL priority threshold. The method 800 ends.

Figure 9:
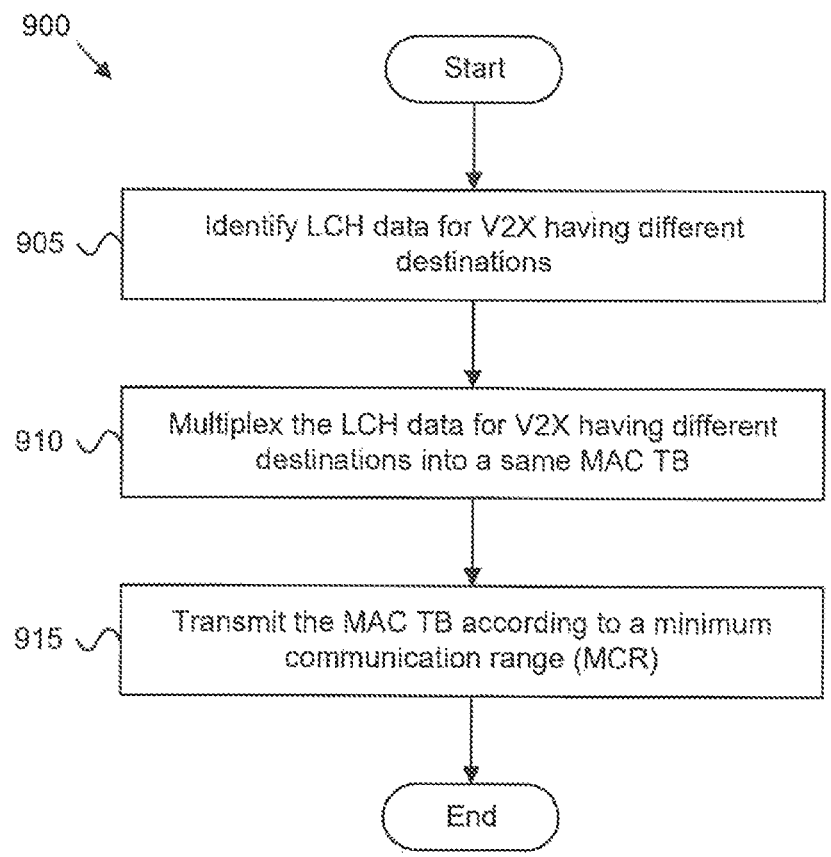
FIG. 9 is a flowchart diagram illustrating one embodiment of a third method that may be used for MAC TB formation and MCR selection.

FIG. 9 depicts one embodiment of a method 900 for MAC TB formation and MCR selection, according to embodiments of the disclosure. In various embodiments, the method 900 is performed by a UE, such as the remote unit 105, the UE 205, and/or the user equipment apparatus 500, described above. In some embodiments, the method 900 is performed by a processor, such as a microcontroller, a microprocessor, a CPU, a GPU, an auxiliary processing unit, a FPGA, or the like.

The method 900 begins and identifies 905 LCH data for V2X having different destinations. The method 900 includes multiplexing 910 the LCH data for V2X having different destinations into a same MAC TB. The method 900 includes transmitting 915 the MAC TB according to a common MCR. The method 900 ends.

Figure 10:
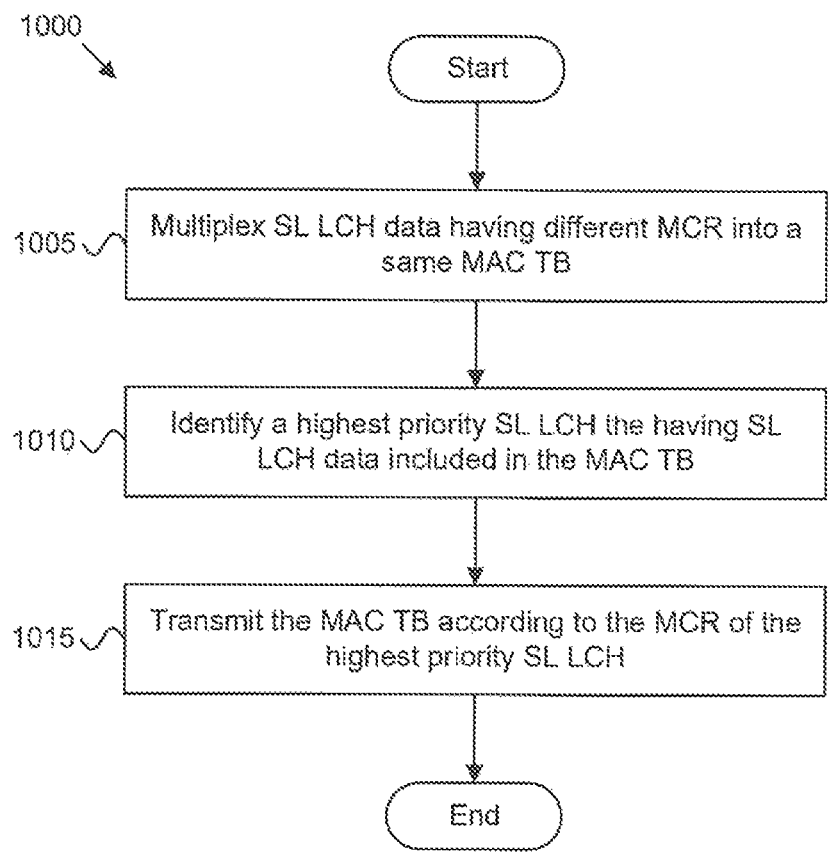
FIG. 10 is a flowchart diagram illustrating one embodiment of a fourth method that may be used for MAC TB formation and MCR selection.

FIG. 10 depicts one embodiment of a method 1000 for MAC TB formation and MCR selection, according to embodiments of the disclosure. In various embodiments, the method 1000 is performed by a UE, such as the remote unit 105, the UE 205, and/or the user equipment apparatus 500, described above. In some embodiments, the method 1000 is performed by a processor, such as a microcontroller, a microprocessor, a CPU, a GPU, an auxiliary processing unit, a FPGA, or the like.

The method 1000 begins and multiplexes 1005 SL LCH data having different MCR into a same MAC TB. The fourth method includes identifying 1010 a highest priority SL LCH the having SL LCH data included in the MAC TB. The method 1000 includes transmitting 1015 the MAC TB according to the MCR of the highest priority SL LCH. The method 1000 ends.

Disclosed herein is a first apparatus for MAC TB formation and MCR selection, according to embodiments of the disclosure. The first apparatus may be implemented by a UE, such as the remote unit 105, the UE 205, and/or the user equipment apparatus 500. The first apparatus includes a transceiver and a processor that identifies SL LCH data having different MCR and multiplexes the SL LCH data having different MCR into a same MAC TB. The processor controls the transceiver to transmit the MAC TB according to a longest MCR among the SL LCHs included in the MAC TB.

In some embodiments, multiplexing the SL LCH data includes multiplexing V2X LCH data having different destinations into the same MAC TB. In some embodiments, multiplexing the SL LCH data includes multiplexing SL LCH data having the same length or shorter MCR as the MCR of the highest priority LCH. In some embodiments, the MAC TB further multiplexes at least one MAC CE, where the at least one MAC CE is not associated with an MCR.

In some embodiments, the MCR is configured for a SL LCH when the SL LCH is established. In certain embodiments, the MCR is indicated (i.e., internally) by higher layer to the access stratum for each QoS flow. In some embodiments, the processor indicates in SCI the longest MCR among the SL LCHs included in the MAC TB.

In some embodiments, the SL data for the MAC TB is selected from a plurality of LCHs. In such embodiments, the processor determines whether each LCH requires HARQ feedback. In certain embodiments, the processor multiplexes the SL LCH data into the same MAC TB by multiplexing data only from LCHs that require HARQ feedback. In other embodiments, the processor multiplexes the SL LCH data into the same MAC TB by multiplexing data only from LCHs that do not require HARQ feedback.

Disclosed herein is a first method for MAC TB formation and MCR selection, according to embodiments of the disclosure. The first method may be performed by a UE, such as the remote unit 105, the UE 205, and/or the user equipment apparatus 500. The first method includes identifying SL LCH data having different MCR and multiplexing the SL LCH data having different MCR into a same MAC TB. The first method includes transmitting the MAC TB according to a longest MCR among the SL LCHs included in the MAC TB.

In some embodiments, multiplexing the SL LCH data includes multiplexing V2X LCH data having different destinations into the same MAC TB. In some embodiments, multiplexing the SL LCH data includes multiplexing SL LCH data having the same length or shorter MCR as the MCR of the highest priority LCH. In some embodiments, the MAC TB further multiplexes at least one MAC CE, where the at least one MAC CE is not associated with an MCR.

In some embodiments, MCR is configured for a SL LCH when the SL LCH is established. In certain embodiments, the MCR is indicated (i.e., internally) by the higher layer to the access stratum for each QoS flow. In some embodiments, the first method includes indicating in sidelink control information the longest MCR among the SL LCHs included in the MAC TB.

In some embodiments, the SL data for the MAC TB is selected from a plurality of LCHs. In such embodiments, the first method includes determining whether each LCH requires HARQ feedback. In certain embodiments, multiplexing the SL LCH data into the same MAC TB includes multiplexing data only from LCHs that require HARQ feedback. In other embodiments, multiplexing the SL LCH data into the same MAC TB includes multiplexing data only from LCHs that do not require HARQ feedback.

Disclosed herein is a second apparatus for MAC TB formation and MCR selection, according to embodiments of the disclosure. The second apparatus may be implemented by a UE, such as the remote unit 105, the UE 205, and/or the user equipment apparatus 500. The second apparatus includes a processor and a transceiver that communicates with a radio access network. The processor detects a time-domain collision between a SL transmission and a UL transmission. Here, the transceiver does not support simultaneous transmission on both SL and UL. The processor identifies a QoS priority of the SL transmission and identifies a QoS priority of the UL transmission. Additionally, the processor prioritizes the SL transmission over the UL transmission in response to the QoS priority of the SL transmission being less than a SL priority threshold and the QoS priority of the UL transmission not being less than a UL priority threshold.

In some embodiments, the processor prioritizes the UL transmission over the SL transmission in response to the QoS priority of the UL transmission being less than a UL priority threshold. In some embodiments, data from multiple SL LCHs is available and is multiplexed into the SL transmission. In such embodiments, the processor identifies the QoS priority of the SL transmission by selecting a priority value of the highest priority SL LCH.

In some embodiments, data from multiple UL LCHs is available and is multiplexed into the UL transmission. In such embodiments, where identifying the QoS priority of the UL transmission includes selecting a priority value of the highest priority UL LCH. In various embodiments, the processor signals the selected priority value in SCI transmitted on a PSCCH. In certain embodiments, a lower QoS priority value indicates higher priority data.

Disclosed herein is a second method for MAC TB formation and MCR selection, according to embodiments of the disclosure. The second method may be performed by a UE, such as the remote unit 105, the UE 205, and/or the user equipment apparatus 500. The second method includes detecting a time-domain collision between a SL transmission and an UL transmission, where the remote unit does not support simultaneous transmission on both SL and UL. The second method includes identifying a QoS priority of the SL transmission and identifying a QoS priority of the UL transmission. The second method includes prioritizing the SL transmission over the UL transmission in response to the QoS priority of the SL transmission being less than a SL priority threshold and the QoS priority of the UL transmission not being less than a UL priority threshold.

In some embodiments, the second method includes prioritizing the UL transmission over the SL transmission in response to the QoS priority of the UL transmission being less than a UL priority threshold. In some embodiments, data from multiple SL LCHs is available and is multiplexed into the SL transmission. In such embodiments, identifying the QoS priority of the SL transmission includes selecting a priority value of the highest priority SL LCH.

In some embodiments, data from multiple UL LCHs is available and is multiplexed into the UL transmission. In such embodiments, where identifying the QoS priority of the UL transmission includes selecting a priority value of the highest priority UL LCH. In various embodiments, the second method further includes signaling the selected priority value in SCI transmitted on a PSCCH. In certain embodiments, a lower QoS priority value indicates higher priority data.

Disclosed herein is a third apparatus for MAC TB formation and MCR selection, according to embodiments of the disclosure. The third apparatus may be implemented by a UE, such as the remote unit 105, the UE 205, and/or the user equipment apparatus 500. The third apparatus includes a transceiver and a processor that identifies LCH data for V2X having different destinations and multiplexes the LCH data for V2X having different destinations into a same MAC TB. The transceiver that transmits the MAC TB according to a common MCR.

In some embodiments, the MAC TB contains multiple Layer-2 identities corresponding to the different destinations. In some embodiments, a single Layer-1 identity containing a portion of a Layer-2 identities corresponding to the different destinations is passed on the physical layer. In some embodiments, a special Layer-1 identity is used in SCI that indicates that Layer-1 filtering is to be skipped for the MAC TB. In such embodiments, the processor controls the transceiver to transmit the SCI.

In some embodiments, the processor determines the common MCR of the MAC TB in response to multiplexing the LCH data for V2X having different destinations. In certain embodiments, the common MCR is determined corresponding to highest priority sidelink LCH included in the MAC TB. In certain embodiments, the common MCR is determined as the MCR of the LCH having the longest MCR among the LCHs included in the TB.

In some embodiments, the common MCR is determined without consideration of a destination of the MAC TB. In some embodiments, the common MCR is determined considering only a highest priority destination of the MAC TB. In some embodiments, the common MCR is determined considering a highest priority cast-type of the MAC TB.

Disclosed herein is a third method for MAC TB formation and MCR selection, according to embodiments of the disclosure. The third method may be performed by a UE, such as the remote unit 105, the UE 205, and/or the user equipment apparatus 500. The third method includes identifying LCH data for V2X having different destinations and multiplexing the LCH data for V2X having different destinations into a same MAC TB. The third method includes transmitting the MAC TB according to a common MCR.

In some embodiments, the MAC TB contains multiple Layer-2 identities corresponding to the different destinations. In some embodiments, a single Layer-1 identity containing a portion of a Layer-2 identities corresponding to the different destinations is passed on the physical layer. In some embodiments, a special Layer-1 identity is used in SCI that indicates that Layer-1 filtering is to be skipped for the MAC TB. In such embodiments, the third method includes transmitting the SCI.

In some embodiments, the third method includes determining the common MCR of the MAC TB in response to multiplexing the LCH data for V2X having different destinations. In certain embodiments, the common MCR is determined corresponding to highest priority sidelink LCH included in the MAC TB. In certain embodiments, the common MCR is determined as the MCR of the LCH having the longest MCR among the LCHs included in the TB.

In some embodiments, the common MCR is determined without consideration of a destination of the MAC TB. In some embodiments, the common MCR is determined considering only a highest priority destination of the MAC TB. In some embodiments, the common MCR is determined considering a highest priority cast-type of the MAC TB.

Disclosed herein is a fourth apparatus for MAC TB formation and MCR selection, according to embodiments of the disclosure. The fourth apparatus may be implemented by a UE, such as the remote unit 105, the UE 205, and/or the user equipment apparatus 500. The fourth apparatus includes a transceiver and a processor that multiplexes SL LCH data having different MCR into a same MAC TB and identifies a highest priority SL LCH the having SL LCH data included in the MAC TB. The transceiver that transmits the MAC TB according to the MCR of the highest priority SL LCH.

Disclosed herein is a fourth method for MAC TB formation and MCR selection, according to embodiments of the disclosure. The fourth method may be performed by a UE, such as the remote unit 105, the UE 205, and/or the user equipment apparatus 500. The fourth method includes multiplexing SL LCH data having different MCR into a same MAC TB and identifying a highest priority SL LCH the having SL LCH data included in the MAC TB. The fourth method includes transmitting the MAC TB according to the MCR of the highest priority SL LCH.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method of a remote unit comprising:
   identifying a sidelink ("SL") destination having a logical channel ("LCH") with a highest priority and data available for transmission, the SL destination being a particular destination of a plurality of candidate destinations;
   identifying a plurality of SL LCHs belonging to the identified SL destination, wherein each of the identified SL LCHs belongs to a same destination;
   determining a Hybrid Automatic Repeat Request ("HARQ") feedback requirement of each SL LCH of the plurality of SL LCHs;
   multiplexing SL LCH data into a same Medium Access Control ("MAC") transport block ("TB"), wherein multiplexing the SL LCH data into the same MAC TB comprises multiplexing data only from a set of SL LCHs having a same HARQ feedback requirement; and
   transmitting the MAC TB according to a longest Minimum Communication Range ("MCR") among the SL LCHs included in the MAC TB, the longest MCR being one of a plurality of candidate MCRs.

2. The method of claim 1, wherein the SL LCH data for the MAC TB is selected from the plurality of SL LCHs, wherein determining the HARQ feedback requirement of each SL LCH comprises determining whether each SL LCH requires HARQ feedback, and wherein multiplexing the SL LCH data into the same MAC TB comprises multiplexing data only from SL LCHs that do not require HARQ feedback.

3. The method of claim 1, further comprising multiplexing at least one MAC control element ("MAC-CE"), wherein the at least one MAC-CE is not associated with an MCR.

4. The method of claim 1, further comprising identifying a MCR for the SL LCH data, wherein a respective MCR is configured for a SL LCH when the SL LCH is established.

5. The method of claim 1, further comprising identifying a MCR for the SL LCH data, wherein a respective MCR is indicated by a higher layer to an access stratum for each quality of service ("QoS") flow.

6. The method of claim 1, further comprising indicating in sidelink control information ("SCI") the longest MCR.

7. The method of claim 1, wherein the SL LCH data for the MAC TB is selected from the plurality of SL LCHs, wherein determining the HARQ feedback requirement of each SL LCH comprises determining whether each SL LCH requires HARQ feedback, and wherein multiplexing the SL LCH data into the same MAC TB comprises multiplexing data only from SL LCHs that require HARQ feedback.

8. A method of a remote unit comprising:
   identifying logical channel ("LCH") data for vehicle-to-everything ("V2X") having different destinations, wherein the LCH data comprises a plurality of service data units ("SDUs") corresponding to a plurality of destinations;
   determining a Hybrid Automatic Repeat Request ("HARQ") feedback requirement of each sidelink ("SL") LCH of a plurality of SL LCHs;
   multiplexing the LCH data for V2X having different destinations into a same medium access control ("MAC") transport block ("TB"), wherein multiplexing the LCH data into the same MAC TB comprises multiplexing data only from a set of SL LCHs having a same HARQ feedback requirement;
   determining a longest minimum communication range ("MCR") of the MAC TB in response to multiplexing the LCH data, the longest MCR being one of a plurality of candidate MCRs corresponding to the plurality of SDUs; and
   transmitting the MAC TB according to the longest MCR.

9. The method of claim 8, wherein the MAC TB comprises multiple Layer-2 ("L2") identities corresponding to the different destinations.

10. The method of claim 8, wherein a single Layer-1 ("L1") identity containing a portion of a Layer-2 ("L2") identities corresponding to the different destinations is passed on a physical ("PHY") layer.

11. The method of claim 8, wherein a special Layer-1 ("L1") identity is used in sidelink control information ("SCI") that indicates that L1 filtering is to be skipped for the MAC TB, the method further comprising transmitting the SCI.

12. A user equipment ("UE") comprising:
   at least one memory; and at least one processor coupled with the at least one memory and configured to cause the UE to:

identify a sidelink ("SL") destination having a logical channel ("LCH") with a highest priority and data available for transmission, the SL destination being a particular destination of a plurality of candidate destinations;

identify a plurality of SL LCHs belonging to the identified SL destination, wherein each of the identified SL LCHs belongs to a same destination;

determine a Hybrid Automatic Repeat Request ("HARQ") feedback requirement of each SL LCH of the plurality of SL LCHs;

multiplex SL LCH data into a same Medium Access Control ("MAC") transport block ("TB"), wherein multiplexing the SL LCH data into the same MAC TB comprises multiplexing data only from a set of SL LCHs having a same HARQ feedback requirement; and transmit the MAC TB according to a longest Minimum Communication Range ("MCR") among the SL LCHs included in the MAC TB, the longest MCR being one of a plurality of candidate MCRs.

13. The UE of claim 12, wherein the SL LCH data for the MAC TB is selected from the plurality of SL LCHs, wherein to determine the HARQ feedback requirement of each SL LCH, the at least one processor is further configured to determine whether each SL LCH requires HARQ feedback, and wherein to multiplex the SL LCH data into the same MAC TB, the at least one processor is further configured to multiplex data only from SL LCHs that do not require HARQ feedback.

14. The UE of claim 12, wherein the at least one processor is further configured to multiplex at least one MAC control element ("MAC-CE"), wherein the at least one MAC-CE is not associated with an MCR.

15. The UE of claim 12, wherein the at least one processor is further configured to indicate in sidelink control information ("SCI") the longest MCR.

16. The UE of claim 12, wherein the SL LCH data for the MAC TB is selected from the plurality of SL LCHs, wherein to determine the HARQ feedback requirement of each SL LCH, the at least one processor is further configured to determine whether each SL LCH requires HARQ feedback, and wherein to multiplex the SL LCH data into the same MAC TB, the at least one processor is further configured to multiplex data only from SL LCHs that require HARQ feedback.

* * * * *